(12) United States Patent
Inoue

(10) Patent No.: US 8,511,788 B2
(45) Date of Patent: Aug. 20, 2013

(54) IMAGE RECORDING METHOD AND APPARATUS

(75) Inventor: Yoshiaki Inoue, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 208 days.

(21) Appl. No.: 13/020,389

(22) Filed: Feb. 3, 2011

(65) Prior Publication Data

US 2011/0187785 A1 Aug. 4, 2011

(30) Foreign Application Priority Data

Feb. 4, 2010 (JP) ................................. 2010-023354

(51) Int. Cl.
*B41J 29/393* (2006.01)

(52) U.S. Cl.
USPC ........................................................ 347/19

(58) Field of Classification Search
CPC ............................ B41J 29/393; B41J 2/04508
USPC ............................................ 347/9, 14, 15, 19
See application file for complete search history.

(56) References Cited

U.S. PATENT DOCUMENTS

| 7,085,002 B2 * | 8/2006 | Ilbery et al. ..................... 358/1.8 |
| 7,537,305 B2 * | 5/2009 | Chiwata ............................. 347/19 |
| 8,256,870 B2 * | 9/2012 | Sasayama ........................ 347/19 |
| 2005/0122366 A1 | 6/2005 | Nagamura et al. |
| 2007/0132804 A1 | 6/2007 | Chiwata |
| 2007/0285457 A1 | 12/2007 | Nagamura et al. |
| 2008/0211850 A1 | 9/2008 | Miyamoto et al. |

FOREIGN PATENT DOCUMENTS

| JP | 2005-169752 A | 6/2005 |
| JP | 2005-178262 A1 | 7/2005 |
| JP | 2005-178263 A | 7/2005 |
| JP | 2007-160748 A | 6/2007 |
| JP | 2008-168592 A | 7/2008 |
| JP | 2009-274234 A | 11/2009 |
| JP | 2009-279234 A | 12/2009 |

OTHER PUBLICATIONS

Japanese Office Action issued on Apr. 4, 2013 in Japanese Patent Application No. 2010-023354.

* cited by examiner

*Primary Examiner* — An Do
(74) *Attorney, Agent, or Firm* — Birch, Stewart, Kolasch & Birch, LLP

(57) ABSTRACT

An image recording method of recording a desired image on a recording medium by a recording head having recording elements which form pixels on the recording medium, while moving at least one of the recording medium and the recording head relatively to each other in a prescribed conveyance direction, the method includes: a defective recording element information acquisition step of acquiring defective recording element information including position information of defective recording elements included in the recording elements; and a defective recording element compensation step of performing compensation for the defective recording elements by using compensation recording elements in accordance with a distance between a pair of the defective recording elements derived from the position information, the compensation recording elements being of normal recording elements included in the recording elements situated nearby the pair of the defective recording elements.

20 Claims, 12 Drawing Sheets

IMAGE RECORDING METHOD AND APPARATUS

BACKGROUND OF THE INVENTION

1. Field of the Invention

The present invention relates to an image recording method and an image recording apparatus, and more particularly, to image correction technology relating to defective recording elements in a recording head having a plurality of recording elements.

2. Description of the Related Art

An inkjet recording apparatus, which forms a desired image on a recording medium by an inkjet method, is an image recording apparatus widely used. The inkjet recording apparatus can include a full-line inkjet head having nozzles (recording elements) arranged in a two-dimensional configuration and achieve high productivity by means of single-pass image recording, which forms an image on the whole surface of paper by performing just one scanning action of the full-line head and the paper.

In an inkjet recording apparatus, a defective recording element which does not have a normal ink ejection state gives rise to various problems. In particular, in the single-pass image recording using a full-line head, stripe-shaped density non-uniformities or banding occur in the recorded image as a result of error in the recording characteristics, such as recording position error, ejected droplet error, ejection failure, and the like, which are caused by defective recording elements, and hence the image quality declines dramatically. Various technologies have been proposed in order to avoid such density non-uniformities caused by the occurrence of defective recording elements.

For example, a method is used in which defective recording elements are disabled for ejection (masked), and a pixel corresponding to each defective recording element is compensated by using pixels recorded by normal recording elements which are peripheral to the defective recording element. Possible examples are technology which corrects density non-uniformities by adjusting the output characteristics of the recording elements in accordance with the characteristics of individual recording elements, and technology which carries out density non-uniformity correction by changing the image information data (tone values) of the pixels assigned to the recording elements. In the former technology, the actual ejection characteristics, such as the droplet volumes, are changed by altering the ejection drive conditions for the respective recording elements, thereby adjusting the dot diameters and the dot density. Implementing this technology places restrictions on the method used in the head and the range of correction. On the other hand, a possible example of the latter technology is the image recording method described in Japanese Patent Application Publication No. 2007-160748. The method which changes the image information data of the pixels which are recorded about the periphery of the pixel to be recorded by the defective recording element, has a high range of freedom and therefore highly accurate correction can be expected.

In the image recording method described in Japanese Patent Application Publication No. 2007-160748, information containing recording characteristics including the recording position errors and the ejected droplet volume errors of the recording elements is acquired, N compensation recording elements (where N is an integer larger than 1) for use in correction of output density are set, and density correction coefficients are specified for the N compensation recording elements according to correction conditions including conditions where a differential coefficient at a frequency origin point in a power spectrum representing spatial frequency characteristics of the density non-uniformity becomes substantially zero.

In the related art, the compensation for defective recording elements is performed by changing image information data of pixels which are peripheral to the pixel to be recorded by each defective recording element, and the concept is of correcting density error caused by the defective recording element by using a plurality of normal recording elements which are positioned at the periphery of the defective recording element.

FIGS. 12A to 12D are schematic drawings for describing the image correction method to compensate defective recording elements in the related art. A recording head 300 in FIG. 12A has a structure in which a plurality of recording elements 302 are arranged in one row at equidistant intervals in a direction (the horizontal direction in FIG. 12A) which is substantially perpendicular to the recording medium conveyance direction (the vertical direction in FIG. 12A), and these recording elements include a defective recording element (a recording element which is not capable of recording desired dots) 304. FIG. 12B shows an image 312 formed on a recording medium 310 by a single-pass method, using the head 300 having the defective recording element 304. Stripe-shaped density non-uniformity 314 following the recording medium conveyance direction occurs in the image 312 at a position corresponding to the defective recording element 304.

FIG. 12C is a diagram showing set values of recording elements in image correction to compensate the defective recording element 304 (see FIG. 12A). When P is taken to be the set value corresponding to the density that has been originally supposed to be recorded by the defective recording element 304, then the set values of the normal recording elements 306A and 306B which are adjacent to the defective recording element 304 on either side thereof in order to correct stripe-shaped non-uniformity occurring due to the presence of the defective recording element 304 is P×M.

FIG. 12D shows a schematic drawing of a density distribution obtained from a macroscopic view of the density of a two-dimensionally recorded image after conversion to one dimension. As shown in FIG. 12D, the density 320 before the correction has low density at the position corresponding to the defective recording element 304, but the density 322 after the correction maintains uniform density throughout, without any reduction in the density at the position corresponding to the defective recording element 304.

In a recording head in which a large number of recording elements are arranged in a two-dimensional configuration, it is readily envisaged that defects may occur in a plurality of recording elements. Moreover, there are cases where the plurality of defective recording elements are in close proximity to each other to the extent of affecting the appearance of recorded image as observed by the human eye. In cases where a plurality of recording elements in mutual proximity have suffered abnormalities, if the above-described compensation for an isolated defective recording element is directly applied, then insufficient compensative functions are displayed and it may be impossible to obtain desired effects.

FIGS. 13A to 13D are illustrative diagrams of a case where the compensation for an isolated defective recording element is directly applied to the compensation for a plurality of defective recording elements which are present in adjacent positions. As shown in FIG. 13A, a case is considered in which two defective recording elements 304-1 and 304-2 are present at positions which are spaced by three elements apart. When image recording is carried out in a single-pass method using this head 300, then as shown in FIG. 13B, stripe-shaped density non-uniformities 314 occur in the recorded image 312 at the positions corresponding respectively to the two defective recording elements 304-1 and 304-2.

Then, as shown in FIG. 13C, when the set value of the recording elements 306A, 306B, 308A and 308B which are adjacent on either side of the two defective elements 304-1 and 304-2 is P×M, similarly to the case where there is one defective recording element (i.e., where there is an isolated defective recording element), then as denoted with reference numeral 332 in FIG. 13D, it can be seen that a problem occurs in that a dark line (the mounded portion 334 represented with a broken line in FIG. 13D) is visible in the recorded image due to the close proximity of the two recording elements 306B and 308B which have increased set values for the purpose of compensation.

In the technology described in Japanese Patent Application Publication No. 2007-160748, if there are two or more ejection failures in the correction range, then stripe-shaped non-uniformities are judged to be of a level that cannot be corrected, and the method transfers to a head cleaning mode. Furthermore, Japanese Patent Application Publication No. 2007-160748 describes excluding ejection failure nozzles from compensative nozzles if mutually adjacent nozzles are suffering ejection failure, but makes no mention of specific compensation performed in a case where a plurality of mutually adjacent nozzles are suffering ejection failure.

SUMMARY OF THE INVENTION

The present invention has been contrived in view of these circumstances, an object thereof being to provide an image recording method and an image recording apparatus, whereby desirable image recording can be achieved even in a case where a plurality of defective recording elements have occurred in mutually proximate positions.

In order to attain the aforementioned object, the present invention is directed to an image recording method of recording a desired image on a recording medium by a recording head having recording elements which form pixels on the recording medium, while moving at least one of the recording medium and the recording head relatively to each other in a prescribed conveyance direction, the method comprising: a defective recording element information acquisition step of acquiring defective recording element information including position information of defective recording elements included in the recording elements; and a defective recording element compensation step of performing compensation for the defective recording elements by using compensation recording elements in accordance with a distance between a pair of the defective recording elements derived from the position information, the compensation recording elements being of normal recording elements included in the recording elements situated nearby the pair of the defective recording elements.

According to this aspect, even if a plurality of defective recording elements occur in mutually proximate positions, the compensation is carried out using recording elements which are situated at the periphery of the defective recording elements in accordance with the defective recording element distance (the distance between the defective recording elements), and therefore excessive compensation between the defective recording elements is suppressed. Consequently, it is possible to effectively carry out compensation for defective recording, and the range of response to defective recording is increased.

A recording element is a concept which includes a nozzle from which droplets are ejected and a light-emitting element which emits light (LED, laser, etc.), and a recording head is a concept which includes heads that perform image recording by various methods, such as an inkjet head that ejects droplets from nozzles, an electrophotographic head which emits light from light-emitting elements, and so on.

Preferably, in the defective recording element compensation step, tone values representing image information data for the compensation recording elements are changed in accordance with the distance between the pair of the defective recording elements.

According to this aspect, decline in density at a recording position of the defective recording element is suppressed by correcting the tone values in the image information data for the recording positions (pixels) corresponding to the recording elements situated at the periphery of the defective recording element.

Preferably, the image recording method further includes, after the defective recording element compensation step, a half-tone processing step of performing half-tone processing to convert image data to multiple-value data of a smaller number of tones than a number of tones of the image data.

According to this aspect, a desirable tone representation is achieved in the periphery of the defective recording element, by performing half-tone processing of image data having corrected density values.

In this mode, desirably, half-tone processing is carried out by setting the density value for the defective recording element to zero.

Preferably, in the defective recording element compensation step, sizes of dots recorded on the recording medium by the compensation recording elements are changed in accordance with the distance between the pair of the defective recording elements.

According to this aspect, desirable compensation is achieved by making the peripheral dot sizes larger, in accordance with the omission of a dot by the defective recording element.

Preferably, the defective recording element information acquisition step includes a defective recording element determination step of performing determination of recording states of the recording elements, and judging whether each of the recording elements is normal or defective in accordance with a result of the determination. This mode can include a storage step of storing the determined recording states of the recording elements.

Preferably, the defective recording element compensation step includes: a first correction function calculation step of calculating a first correction function which is determined in accordance with a tone value of a recording position corresponding to each of the defective recording elements; a second correction function calculation step of calculating a second correction function which applies weighting to each of the compensation recording elements in accordance with the distance between the pair of the defective recording elements, in such a manner that a tone value of a recording position corresponding to the compensation recording element that is situated between the pair of the defective recording elements is smaller than a tone value of a recording position corresponding to the compensation recording element that is not situated between the pair of the defective recording elements; a tone correction function calculation step of calculating a tone correction function which is determined by the first correction function and the second correction function; and a pixel value correction step of correcting the tone values of the recording positions corresponding to the compensation recording elements in accordance with the tone correction function.

According to this aspect, excessive compensation in recording positions between the defective recording elements is suppressed by making the tone value of the recording position corresponding to the recording element situated between the defective recording elements smaller than the tone value of the recording position corresponding to the recording element not situated between the defective recording elements.

Preferably, the compensation recording elements include the normal recording elements situated on either side of each of the defective recording elements and having shortest distances from said each of the defective recording elements among the normal recording elements, in a projected recording element row in which the recording elements are projected so as to align in a direction substantially perpendicular to the conveyance direction.

In this mode, a plurality of recording elements which are situated at the periphery of the defective recording element can be used for the compensation, apart from the recording elements which are adjacent to the defective recording element.

Preferably, a position of an i-th defective recording element of the defective recording elements in the projected recording element row is represented as $X_i$; a distance from the i-th defective recording element to an (i+1)-th defective recording element of the defective recording elements is represented as $D_i$; a tone value of input image data of a pixel in the recording position of each of the defective recording elements is represented as c; the first correction function is represented as $F_1(c)$ with the tone value c as a parameter; the second correction function is represented as $F_2(D_i)$ with the distance $D_i$ as a parameter; the tone correction function of the compensation recording element at a position $(X_i-1)$ adjacent to the position of the i-th defective recording element is expressed as $F(X_i-1)=F_1(c) \times F_2(D_{(i-1)})$; and the tone correction function of the compensation recording element at a position $(X_i+1)$ adjacent to the position of the i-th defective recording element is expressed as $F(X_i+1)=F_1(c) \times F_2(D_{(i)})$.

In this mode, the first correction function $F_1(c)$ can be determined in such a manner that the pixel value of the defective recording element is divided evenly to the peripheral recording elements used for the compensation.

Preferably, the second correction function $F_2(D_i)$ has a maximum value of 1.

In this mode, the second correction function $F_2(D_1)$ can be determined and stored in advance.

Preferably, the image recording method further includes a second correction function storage step of storing the second correction function $F_2(D_i)$ in a form of a one-dimensional look-up table for each of the recording elements.

In order to attain the aforementioned object, the present invention is also directed to an image recording apparatus comprising: a recording head having recording elements which form pixels on a recording medium; a conveyance device which moves at least one of the recording medium and the recording head relatively to each other in a prescribed conveyance direction; a defective recording element information acquisition device which acquires defective recording element information including position information of defective recording elements included in the recording elements; and a defective recording element compensation device which performs compensation for the defective recording elements by using compensation recording elements in accordance with a distance between a pair of the defective recording elements derived from the position information, the compensation recording elements being of normal recording elements included in the recording elements situated nearby the pair of the defective recording elements.

Preferably, the defective recording element compensation device changes tone values representing image information data for the compensation recording elements in accordance with the distance between the pair of the defective recording elements.

Preferably, the image recording apparatus further comprises a half-tone processing device which performs half-tone processing to convert image data having been subjected to the compensation for the defective recording elements by the defective recording element compensation device, to multiple-value data of a smaller number of tones than a number of tones of the image data.

Preferably, the defective recording element compensation device changes sizes of dots recorded on the recording medium by the compensation recording elements in accordance with the distance between the pair of the defective recording elements.

Preferably, the defective recording element information acquisition device includes a defective recording element determination device which performs determination of recording states of the recording elements, and judges whether each of the recording elements is normal or defective in accordance with a result of the determination.

Preferably, the defective recording element compensation device includes: a first correction function calculation device which calculates a first correction function which is determined in accordance with a tone value of a recording position corresponding to each of the defective recording elements; a second correction function calculation device which calculates a second correction function which applies weighting to each of the compensation recording elements in accordance with the distance between the pair of the defective recording elements, in such a manner that a tone value of a recording position corresponding to the compensation recording element that is situated between the pair of the defective recording elements is smaller than a tone value of a recording position corresponding to the compensation recording element that is not situated between the pair of the defective recording elements; a tone correction function calculation device which calculates a tone correction function which is determined by the first correction function and the second correction function; and a pixel value correction device which corrects the tone values of the recording positions corresponding to the compensation recording elements in accordance with the tone correction function.

According to the present invention, even if a plurality of defective recording elements occur in mutually proximate positions, compensation is carried out using recording elements which are situated at the periphery of the defective recording elements in accordance with the defective recording element distance (the distance between the defective recording elements), and therefore excessive compensation between the defective recording elements is suppressed. Consequently, it is possible to effectively carry out compensation for defective recording elements, and the range of response to defective recording is increased.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Compensation for Defective Recording Elements

Firstly, compensation for defective recording elements in an image recording method according to an embodiment of the present invention is described.

FIGS. 1A to 1D show schematic views of the image recording method in an embodiment of the present embodiment.

Figure 1A:
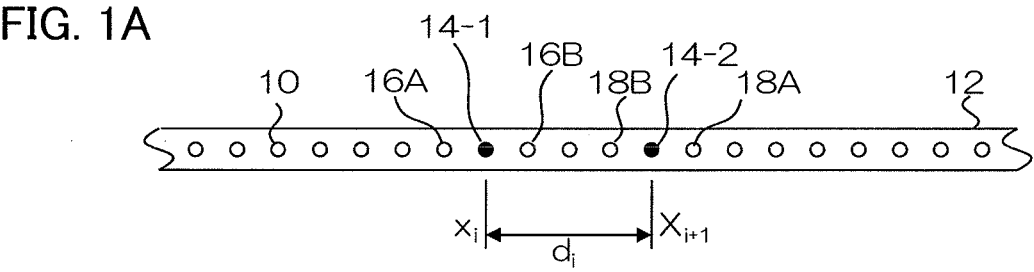
FIGS. 1A to 1D are schematic views of an image recording method according to an embodiment of the present embodiment.

FIG. 1A shows a schematic view of an inkjet head 12, which includes a plurality of nozzles (recording elements) 10. The inkjet head 12 shown in FIG. 1A has a structure in which N nozzles 10 are arranged (where N is an integer larger than 1) in one row at a prescribed arrangement pitch in a direction substantially perpendicular to the conveyance direction of the recording medium. Nozzles numbers 1 to N are assigned to the N nozzles. If there are n defective nozzles (where n is an integer from 1 to N), then the position of the i-th defective nozzle of the n defective nozzles is $X_i$ (where i is an integer from 1 to n). In other words, $X_i$ indicates each nozzle number from 1 to N.

The distance $d_i$ between the defective nozzle at position $X_i$ and the defective nozzle at position $X_{(i+1)}$ is calculated as:

$$d_i = X_{(i+1)} - X_i \text{ (excluding } i=0,n).$$

If the distances between the defective nozzles at either end (i=0, i=n) are expressed as a number of nozzles (or number of pixels), then the following definitions are obtained:

$$d_0 = X_1 - 1; \text{ and}$$

$$d_n = N - X_n$$

For example, if the total number of nozzles N is 10000, and the 10-th, 200-th, 5000-th and 5003-rd nozzles are defective nozzles, then $X_1=10$, $X_2=200$, $X_3=5000$, $X_4=5003$, and $d_0=9$, $d_1=190$, $d_2=4800$, $d_3=3$ and $d_4=4997$.

Of the nozzles 10 shown in FIG. 1A, there are two defective nozzles 14-1 and 14-2 at the positions $X_i$ and $X_{(i+1)}$. The distance $d_i$ between the defective nozzle 14-1 at position $X_i$ and the defective nozzle 14-2 at position $X_{(i+1)}$ is calculated as $d_i = X_{(i+1)} - X_i = 4$ (nozzles or pixels).

Figure 1B:
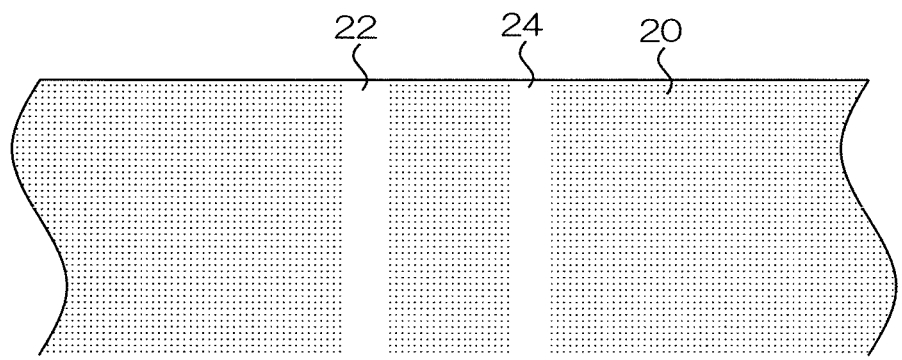

FIG. 1B shows an image 20 recorded in a single-pass method using the head 12 having the two defective nozzles 14-1 and 14-2. In the image 20 shown in FIG. 1B, stripe-shaped density non-uniformities 22 and 24 occur in recording positions where the recording has been performed by the defective nozzles 14-1 and 14-2 shown in FIG. 1A.

In the image recording method described in the present embodiment, with respect to the normal nozzle 16A that is located at position $(X_i-1)$, of the normal nozzles 16A and 16B situated on either side of the defective nozzle 14-1, a tone correction coefficient $Q_1$ (see FIG. 1C) for defective recording element compensation is set on the basis of the distance $d_{(i-1)}$ between the defective nozzles. With respect to the normal nozzle 16B that is located at position $X_i+1$, a tone correction coefficient $Q_2$ for defective recording element compensation is set on the basis of the distance $d_i$ between the defective nozzles.

Similarly, with respect to the normal nozzle 18B that is located at position $X_{(i+1)}-1$, of the normal nozzles 18A and 18B situated on either side of the defective nozzle 14-2 (at position $X_{(i+1)}$), the tone correction coefficient $Q_2$ for defective recording element compensation is set on the basis of the distance $d_{(i+1)}$ between the defective nozzles. With respect to the normal nozzle 18A that is located at position $X_{(i+1)}+1$, the tone correction coefficient $Q_1$ for defective recording element compensation is set on the basis of the distance $d_{(i+1)}$ between the defective nozzles.

Figure 1C:
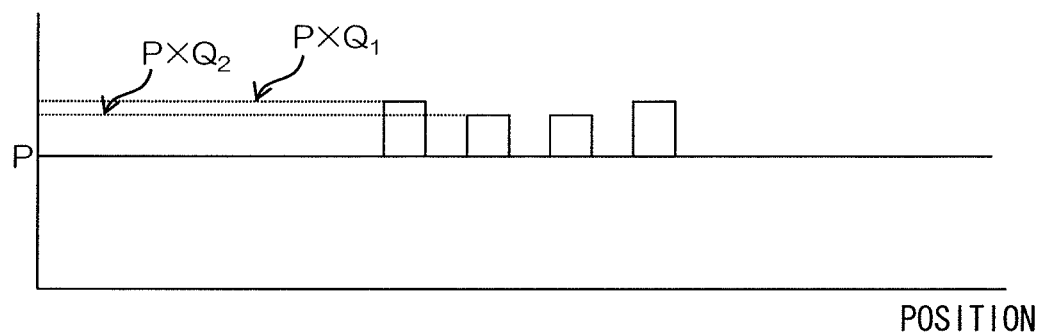
Figure 1D:
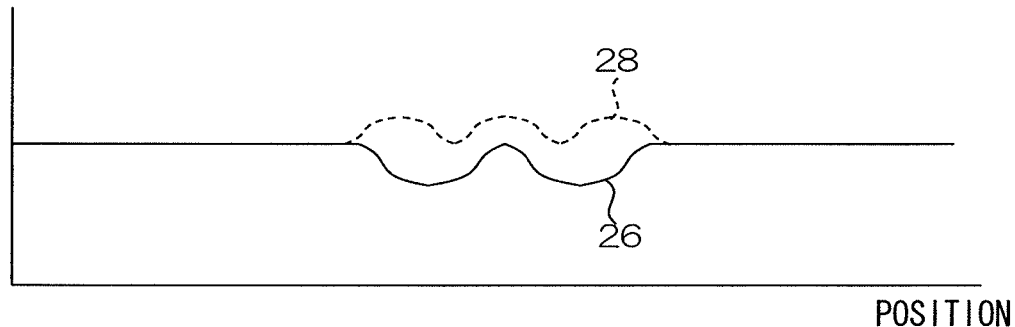

FIG. 1D is a diagram showing the effects of the image recording method in the present embodiment. A solid line 26 in FIG. 1D is a schematic representation of the macroscopic density in an image recorded by using the set values before the correction (the tone values at the recording positions (pixels) corresponding to normal nozzles before the correction), and a fall in density caused by each of the defective nozzles 14-1 and 14-2 is observed and density non-uniformities are visible.

Figure 13A:
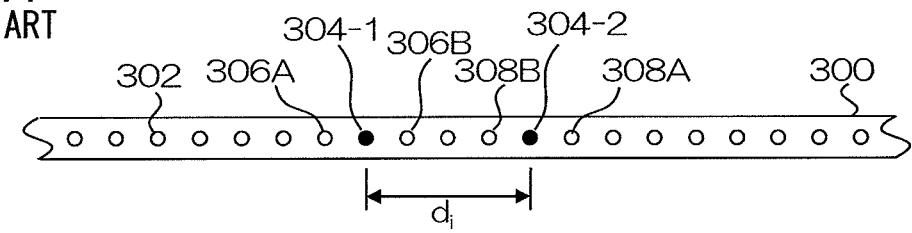
FIGS. 13A to 13D are diagrams for describing an example in which the compensation method shown in FIGS. 12A to 12D is applied to a case where there are a plurality of defective recording elements.
Figure 13B:
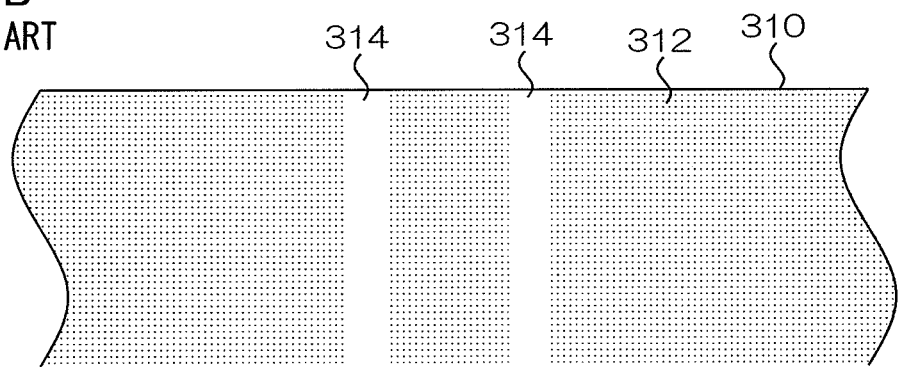
Figure 13C:
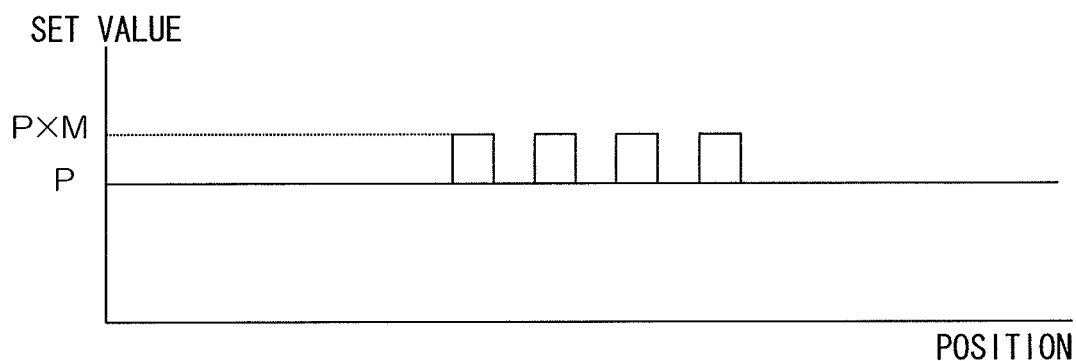
Figure 13D:
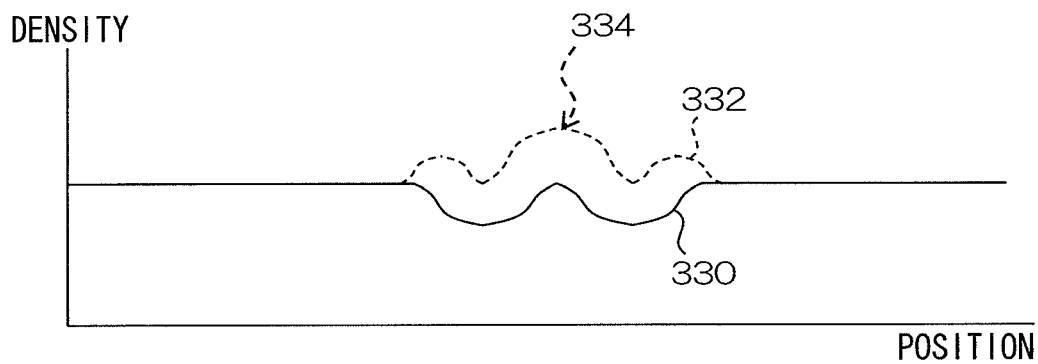

On the other hand, a broken line 28 is a schematic representation of the macroscopic density in an image recorded using the set values after the correction using the tone correction coefficients $Q_1$ and $Q_2$ for defective recording element compensation (the tone values at the recording positions (pixels) corresponding to the normal nozzles after the correction), and increase in density due to the excessive correction as represented with the broken line in FIG. 13D is suppressed and a uniform density is visible.

The tone correction coefficients $Q_1$ and $Q_2$ shown in FIG. 1C are represented by a tone correction function $F(X_i)$ for defective recording element compensation with the nozzle position $X_i$ as a parameter. The tone correction function $F(X_i)$ is obtained by multiplying a first correction function $F_1(c)$ that is for compensating one isolated nozzle by a second correction function $F_2(D_i)$ that is determined in accordance with the defective recording element distance information $D_i$.

The first correction function $F_1(c)$ is determined by a commonly known method, and provides a correction function for cases where defective nozzles for respective tone values c are isolated (the defective nozzles are separated by a sufficiently large distance so that there is no mutual interference therebetween) in the input image data for the pixels to be recorded by the defective nozzles. For example, if the defective nozzle 14-1 at position $X_i$ is taken to be an isolated defective nozzle, and image recording is carried out by taking the set values after correction to be 1.5 times the normal set values for the respective recording positions of the normal nozzle 16A at position $X_i-1$ and the normal nozzle 16B at position $X_i+1$, which are adjacent to the defective nozzle 14-1, so as to compensate the droplet volume to be deposited by the defective nozzle 14-1 by means of the normal nozzles 16A and 16B, then the first correction function $F_1(c)$ corresponds to "1.5" in this case. In actual practice, the dot diameter of the deposited ink droplet varies in accordance with the output tone value and interference between deposited ink droplets also occurs, and therefore the correction coefficient varies with the tone value c in the input image data for the pixel that is to be compensated. Consequently, the first correction function $F_1(c)$ is expressed as a function with the tone value c in the input image data for the pixel corresponding to the defective nozzle as a parameter.

Figure 2:
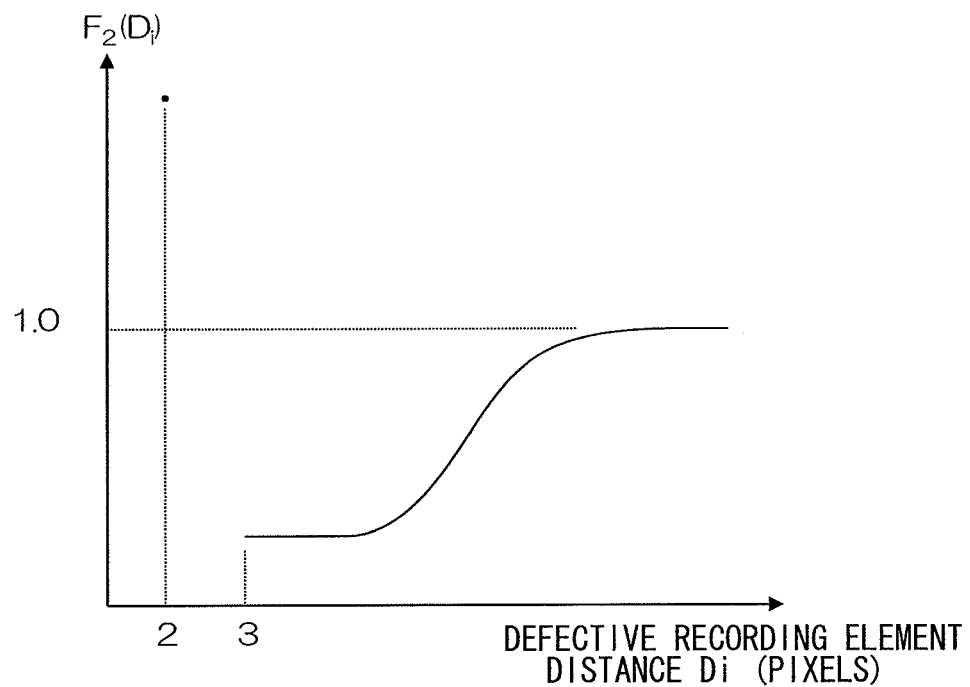
FIG. 2 is a diagram for describing a second correction function.

FIG. 2 is a diagram showing the second correction function $F_2(D_i)$ expressed as a function with the defective recording element distance information $D_i$ indicating the distance between the defective nozzle 14-1 and the defective nozzle 14-2, as a parameter. As shown in FIG. 2, the second correction function $F_2(D_i)$ is represented by a curve having a maximum value of 1 in the range of $D_i \geq 3$.

$D_i=2$ means a case where the distance between the defective nozzles is two nozzles (there is only one nozzle between the defective nozzles), and here the second correction function $F_2(2)$ has a large value exceeding 1, as shown in FIG. 2. Further, $D_i=1$ means a case where the distance between the defective nozzles is one nozzle (the defective nozzles are next to each other), and since there is no nozzle that can be used for the compensation between the defective nozzles, this case is not shown in FIG. 2. When $D_i=1$, apart from special cases where the formed dot diameter is three or more times larger than the dot formation pitch, for example, it is considered difficult to perform the compensation by means of the defective recording element compensation method in the present embodiment.

The tone correction function $F(X_i-1)$ for the normal nozzle 16A at the position $X=X_i-1$ on the left-hand side of the defective nozzle 14-1 in FIG. 1A, and the tone correction function $F(X_i+1)$ for the normal nozzle 16B at the position $X=X_i+1$ on the right-hand side of the defective nozzle 14-1 in FIG. 1A, are expressed as:

$$F(X_i-1)=F_1(c) \times F_2(D_{(i-1)}); \text{ and}$$

$$F(X_i+1)=F_1(c) \times F_2(D_{(i)}).$$

These functions correspond respectively to $Q_1$ and $Q_2$ in FIG. 1C.

Figure 3:
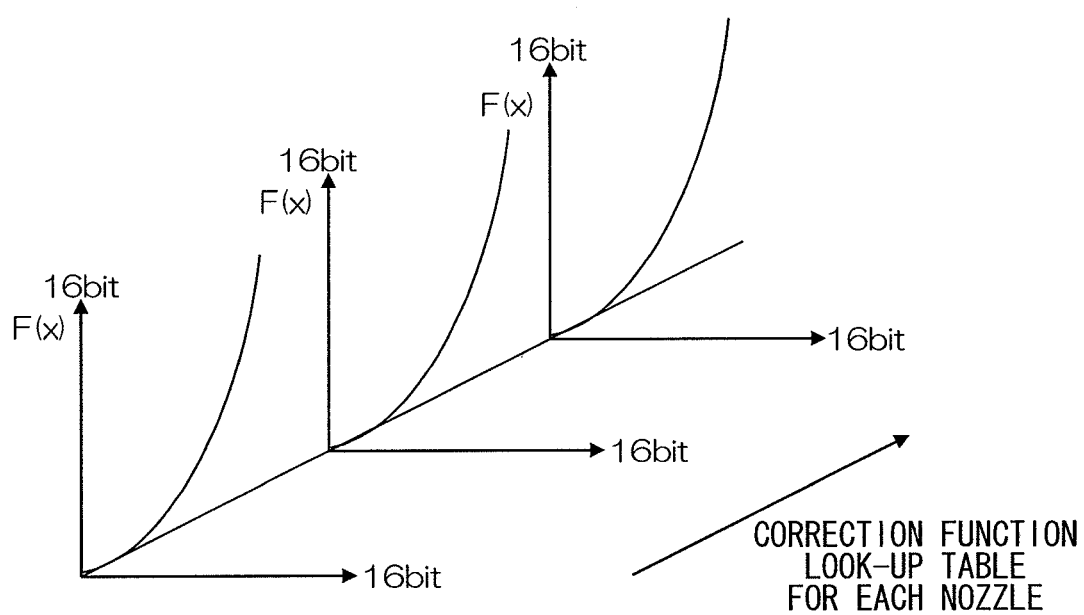
FIG. 3 is a diagram showing a storage format of tone correction functions for defective recording element compensation.

The tone correction functions $F(X_i)$ thus determined are represented in the form of a one-dimensional look-up table for each nozzle (for example, as 16-bit data). FIG. 3 shows a one-dimensional look-up table which represents tone correction functions $F(\text{nozzle}, X_i)$ for defective recording element compensation.

Figure 4:
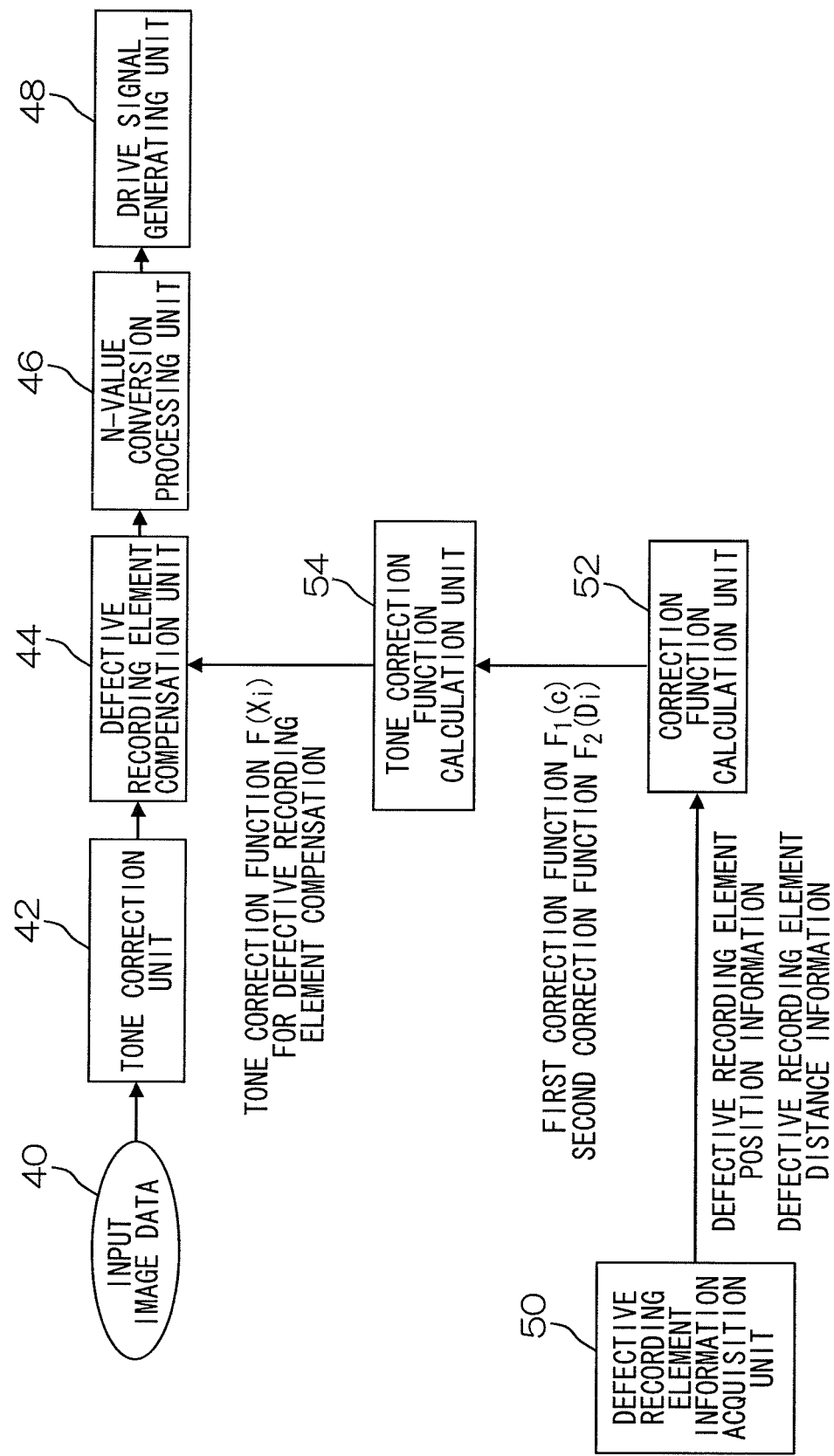
FIG. 4 is a block diagram showing the general composition of an image correction unit.

FIG. 4 is a block diagram showing the principal components of hardware for achieving the image recording method described above. Acquired input image data is converted into multiple-tone image data for each color which can be output, in a color conversion unit (not shown). For example, in the image recording based on the inkjet method, inks of the respective colors of C (cyan), M (magenta), Y (yellow) and K (black) are used. Inks such as red ink, green ink, blue ink, or light inks of the same colors (light cyan, light magenta, gray), and the like, can also be used. When using the inks of the four colors of C, M, Y and K described above, serial processing or parallel processing of color plates of the respective colors of C, M, Y and K is carried out.

In the description given below, processing is explained in relation to one ink color of the plurality of colors which can be output in the inkjet method, and it is assumed that similar processing is carried out in respect of the other colors and therefore description thereof is omitted.

Input image data 40 (image data of multiple-tones having M values) is subjected to gamma conversion in a tone correction unit 42 and thereby converted to desired tones. On the other hand, in a defective recording element information acquisition unit 50, defective recording element information including information relating to the positions of defective nozzles (defective recording element position information) and information about the distance between the defective nozzles (defective recording element distance information) is acquired.

More specifically, if a nozzle at nozzle position $X_i$ is defective, then the defective recording element position information $X_i$ is acquired. When other defective recording element position information is acquired, defective recording element distance information $D_i$ is calculated. In the example shown in FIG. 1A, the defective recording element distance $D_i$ is three pixels (three nozzles, a difference in the nozzle numbers).

In a correction function calculation unit 52, the second correction function $F_2(D_i)$ is calculated on the basis of the defective recording element position information $X_i$ and the defective recording element distance information $D_i$. Moreover, in a tone correction function calculation unit 54, the tone correction functions $F(X_i-1)$ and $F(X_i+1)$ for defective recording element compensation are derived from the first correction function $F_1(c)$ and the second correction function $F_2(D_i)$, for the normal nozzles (the nozzle at position $X_i-1$ and the nozzle at position $X_i+1$) which record pixels peripheral to the pixel to be recorded by the defective nozzle at position $X_i$.

A defective recording element compensation unit 44 performs the defective recording element compensation in respect of the input image that has been tone corrected by means of the tone correction functions $F(X_i)$ corresponding to the positions of the respective defective nozzles. More specifically, the recording positions corresponding to the defective nozzles are ascertained from the defective recording element position information, and the data at the recording positions corresponding to the nozzles adjacent to the defective nozzles is corrected by means of the tone correction functions $F(X_i)$.

The image data that has been corrected by the defective recording element compensation unit 44 is subjected to halftone processing using a threshold matrix method, an error diffusion method, or the like, by an N-value conversion processing unit 46, thereby converting the data having M values into the data having N values (N-value dot image data, where $M>N \geq 2$). The image data that has been converted to the N value data is sent to a drive signal generating unit 48, which generates a drive signal for driving the inkjet head 12 (see FIG. 1A).

When the inkjet head is driven by the drive signal generated by the drive signal generating unit 48, N-tone image recording is performed. When N=2, a tone representation based on "dot present" or "dot absent" is obtained. When N=3, a tone representation based on "no dot", "small dot", "medium dot" is obtained.

Figure 5:
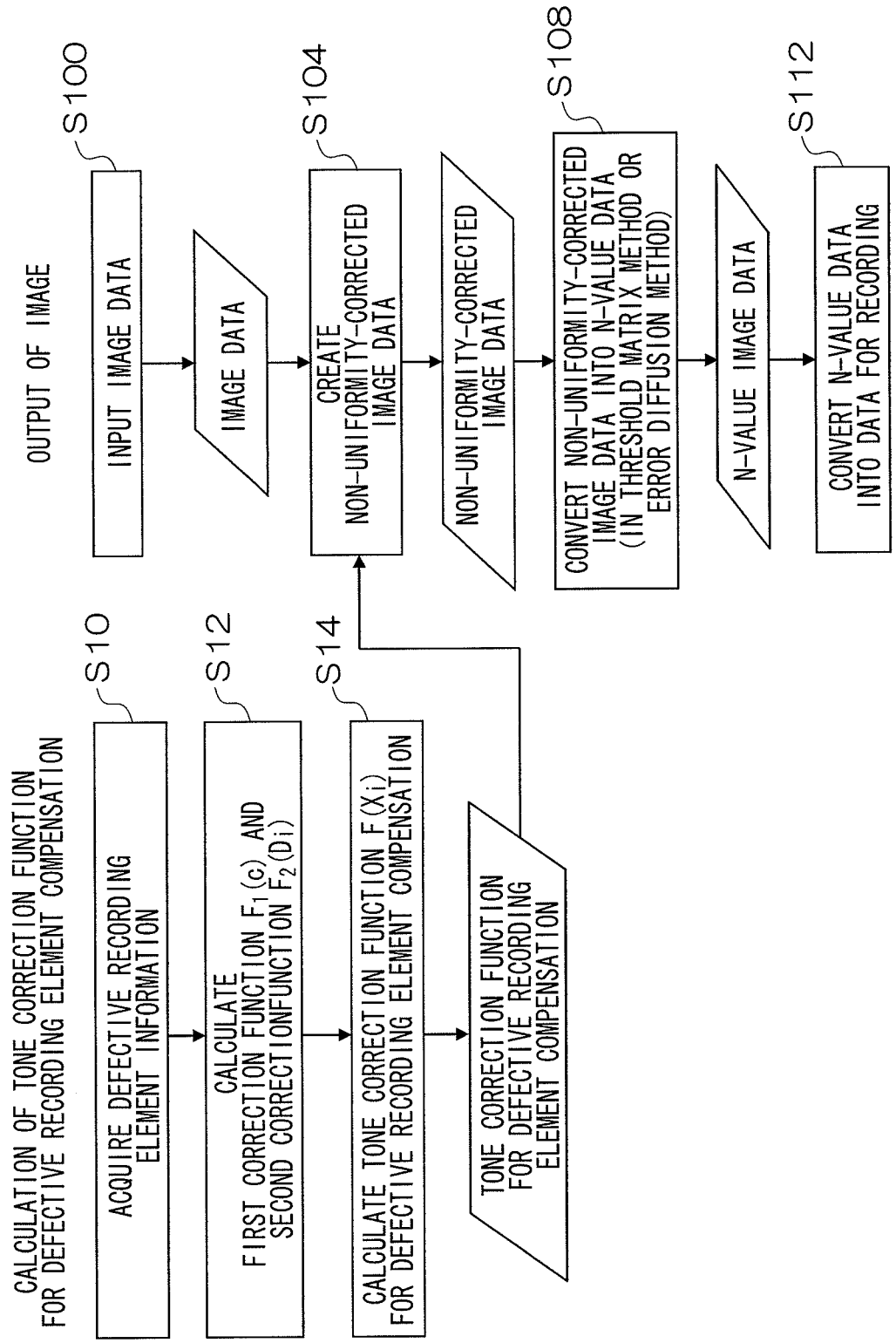
FIG. 5 is a flowchart showing a sequence of an image recording method according to an embodiment of the present invention.

FIG. 5 is flowchart showing a sequence of the image recording method in the present embodiment. The image recording method in the present embodiment is divided broadly into a group of steps of calculating tone correction functions for defective recording element compensation (steps S10 to S14), and steps of outputting an N-tone image (steps S100 to S112).

The steps for calculating the tone correction functions for defective recording element compensation include: a step of acquiring the defective recording element information in which the defective recording element position information $X_i$ is acquired and the defective recording element distance information $D_i$ is derived (step S10); a step of calculating the correction functions in which the first correction function $F_1(c)$ and the second correction function $F_2(D_i)$ are calculated (step S12); and a step of calculating the tone correction functions for defective recording element compensation in which the tone correction functions $F(X_i)$ for defective recording element compensation are calculated (step S14). The tone correction functions for defective recording element compensation are supplied to a non-uniformity-corrected image data creating step (step S104) in the image outputting steps.

On the other hand, the image outputting steps include: an image data input step (step S100) of inputting image data that has been color converted to RGB or CMYK data represented by 256 tones, for example; the non-uniformity-corrected image data creating step (step S104) in which the input image data is subjected to gamma conversion processing and is also subjected to correction processing in respect of the recording positions of defective nozzles by means of the tone correction functions for defective recording element compensation; an N-value conversion processing step (step S108) of converting the non-uniformity-corrected image data into N-value data having 256 values or less; and a recording data conversion step (step S112) of converting the N-value image data which has been converted by the N-value conversion processing step into data for recording (data for generating a drive signal).

One possible mode for acquiring defective recording element information is a mode where image recording is performed without correction using the tone correction functions for defective recording element compensation, the recorded image is read in using an imaging device, such as a CCD image sensor, and the presence or absence of defective nozzles and the positions of defective nozzles is acquired from the read results. This procedure can be carried out in a preparatory step before performing image recording, or can be carried out during image recording (for each sheet, for example). If carried out during image recording, the blank margin of the paper, or the like, can be utilized for the procedure.

A composition may also be adopted in which data including the presence/absence of defective nozzles and the positions of defective nozzles, and the like, is recorded in a recording medium during the factory inspection for shipment of the recording head and is input though the recording medium, or the like.

It is preferable that the image read in by the imaging device is a special image called a test chart or a nozzle check pattern. Furthermore, the sequence of processes including image recording, image reading and extraction of defective nozzle information may be carried out integrally within the same device, or may be carried out in separate devices. Moreover, it is possible to determine a defective nozzle using any of commonly known methods, such as ascertaining the state of respective nozzles by capturing images of droplets in flight which have been ejected from the nozzles.

The "defective nozzle (defective recording element)" in the present embodiment not only refers to an ejection failure nozzle that can not perform ejection, but also includes abnormal nozzles other than the normal nozzle that can record a dot of a size within a prescribed range of error at a recording position within a prescribed range of error, such as abnormal nozzles which cause ejection position defects where the recording positions are displaced, ejection volume failures where the ejection volumes are excessively large or excessively small compared to the intended ejection volume, cases where dots which are originally intended to be perceived as one dot are visible as two or more of dots, cases where there is occurrence of satellite dots where a droplet is dispersed into small dots rather than forming a single dot, and so on.

The image recording method described in the present embodiment is used in respect of the defective nozzles which are in mutual proximity so as to affect the appearance of recorded image as observed by the human eye. For example, in a case where the recording resolution is 1200 dpi, the recorded image can be affected when the defective recording element distance $D_i$ is about 16 pixels or less. In the inkjet method, although it depends on the image formation conditions (dot diameter, dot interference), appreciable density non-uniformity appears markedly when the defective recording element distance is 6 pixels or less.

According to the image recording method having the composition described above, if a plurality of defective nozzles have occurred in mutually proximate positions, compensation processing corresponding to the degree of proximity of the plurality of defective nozzles is carried out using the tone correction coefficients for defective recording element compensation which are based on the defective recording element distance, and therefore density non-uniformity caused by excessive correction between the defective nozzles is suppressed and desirable image recording is carried out.

In the present embodiment, the mode has been described in which correction processing is carried out in respect of image data before half-tone processing, but it is also possible to carry out correction using similar correction coefficients on the ejection data (drive signal) after half-tone processing. For instance, it is possible to apply a weighting in such a manner that the drive voltage applied to the nozzles 16B and 18B is lower than the drive voltage applied to the nozzles 16A and 18A in FIG. 1A. Thereby, the size of dots recorded by the nozzles 16B and 18B becomes smaller than the size of dots recorded by the nozzles 16A and 18A.

Whether employing the correction before half-toning or the correction after half-toning, it is possible to make the density or size of the dots recorded by the nozzles 16B and 18B in FIG. 1A smaller than the density or size of the dots recorded by the nozzles 16B and 18B.

An inkjet recording apparatus equipped with an inkjet head having a plurality of nozzles is described next as an embodiment of an apparatus composition to which the above-described image recording method is applied.

Description of Entire Composition of Inkjet Recording Apparatus

An inkjet recording apparatus which forms a desired image on a recording medium by ejecting ink from nozzles serving as recording elements is described here as an embodiment of an apparatus composition to which the image recording method of the present invention is applied. The scope of application of the present invention is not limited to an inkjet recording apparatus, but rather the present invention may also be applied widely to image recording apparatuses which record dots on a recording medium by a recording method such as electrophotography.

Figure 6:
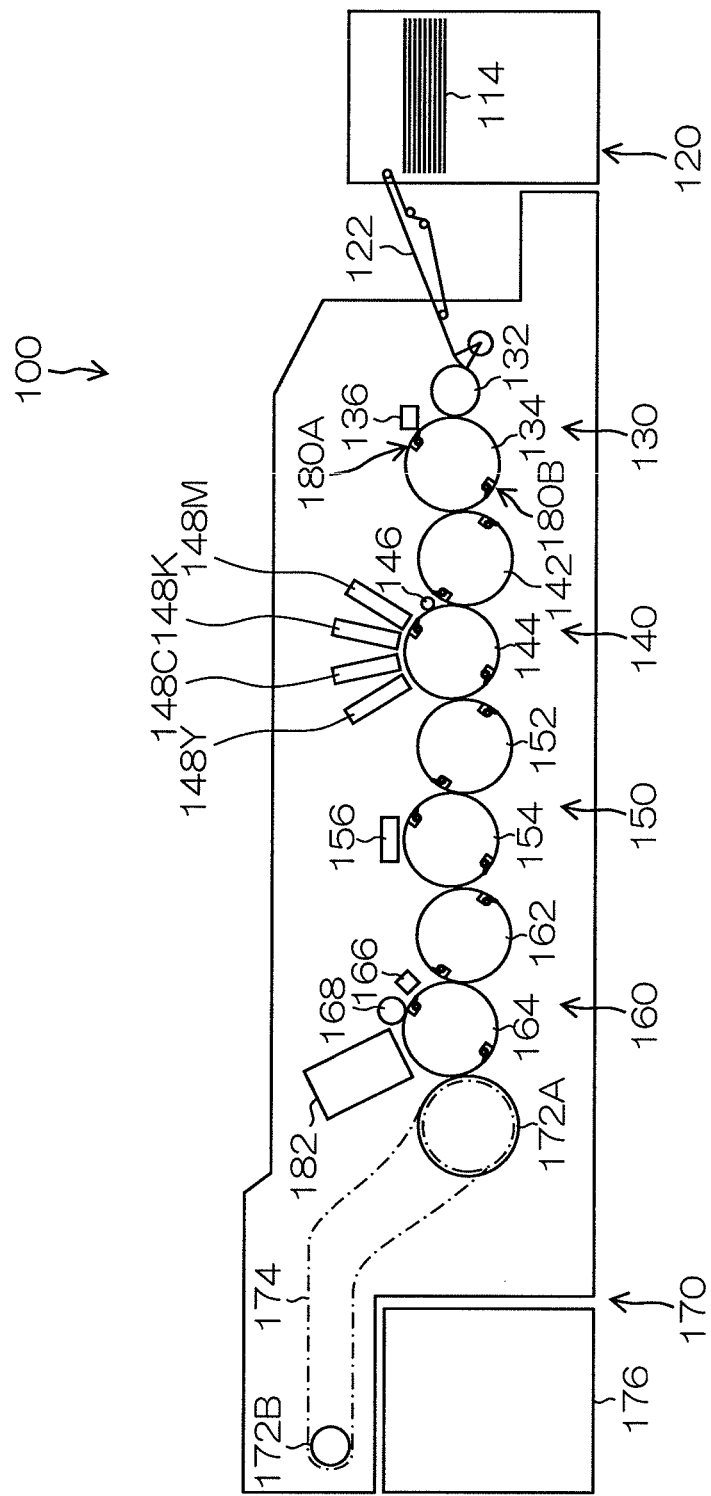
FIG. 6 is a general schematic drawing of an inkjet recording apparatus according to an embodiment of the present invention.

FIG. 6 is a schematic drawing showing the general composition of the inkjet recording apparatus according to the present embodiment. The inkjet recording apparatus 100 shown in FIG. 6 is a recording apparatus based on a two-liquid aggregation system which forms an image on a recording surface of a recording medium 114 on the basis of prescribed image data, by using ink containing coloring material and an aggregating treatment liquid having a function of aggregating the ink.

The inkjet recording apparatus 100 includes a paper feed unit 120, the treatment liquid application unit 130, an image formation unit 140, a drying process unit 150, a fixing process unit 160 and an output unit 170. Transfer drums 132, 142, 152 and 162 are arranged as devices which receive and transfer the recording medium 114 conveyed respectively from stages prior to the treatment liquid application unit 130, the image formation unit 140, the drying process unit 150, and the fixing process unit 160. Pressure drums 134, 144, 154 and 164 having a drum shape are arranged as devices for holding and conveying the recording medium 114 respectively in the treatment liquid application unit 130, the image formation unit 140, the drying process unit 150 and the fixing process unit 160.

Each of the transfer drums 132, 142, 152 and 162 and the pressure drums 134, 144, 154 and 164 is provided with grippers 180A and 180B, which grip and hold the leading end portion (or the trailing end portion) of the recording medium 114. The gripper 180A and the gripper 180B adopt a common structure for gripping and holding the leading end portion of the recording medium 114 and for transferring the recording medium 114 with respect to the gripper arranged in another pressure drum or transfer drum; furthermore, the gripper 180A and the gripper 180B are disposed in symmetrical positions separated by 180° in the direction of rotation of the pressure drum 134 on the outer circumferential surface of the pressure drum 134.

When the transfer drums 132, 142, 152 and 162 and the pressure drums 134, 144, 154 and 164 which have gripped the leading end portion of the recording medium 114 by means of the grippers 180A and 180B rotate in a prescribed rotational direction, the recording medium 114 is rotated and conveyed following the outer circumferential surface of the transfer drums 132, 142, 152 and 162 and the pressure drums 134, 144, 154 and 164.

In FIG. 6, only the reference numerals of the grippers 180A and 180B arranged on the pressure drum 134 are indicated, and the reference numerals of the grippers on the other pressure drums and transfer drums are omitted.

When the recording medium (cut sheet paper) 114 accommodated in a paper feed unit 120 is supplied to the treatment liquid application unit 130, the aggregating treatment liquid (hereinafter referred to simply as "treatment liquid") is applied to the recording surface of the recording medium 114 held on the outer circumferential surface of the pressure drum 134. The "recording surface of the recording medium 114" is the outer surface when the recording medium 114 is held by the pressure drums 134, 144, 154 and 164, this being reverse to the surface held on the pressure drums 134, 144, 154 and 164.

Thereupon, the recording medium 114 on which the aggregating treatment liquid has been applied is output to the image formation unit 140 and colored inks are deposited by the image formation unit 140 onto the area of the recording surface where the aggregating treatment liquid has been applied, thereby forming a desired image.

Moreover, the recording medium 114 on which the image has been formed by the colored inks is sent to the drying process unit 150, and a drying process is carried out by the drying process unit 150. After the drying process, the recording medium 114 is conveyed to the fixing process unit 160, and a fixing process is carried out. By carrying out the drying process and the fixing process, the image formed on the recording medium 114 is made durable. In this way, the desired image is formed on the recording surface of the recording medium 114 and after fixing the image on the recording surface of the recording medium 114, the recording medium 114 is conveyed to the exterior of the inkjet recording apparatus 100 through the output unit 170.

The respective units of the inkjet recording apparatus 100 (paper feed unit 120, treatment liquid application unit 130, image formation unit 140, drying process unit 150, fixing process unit 160 and output unit 170) are described in detail below.

<Paper Feed Unit>

The paper feed unit 120 includes a paper feed tray 122 and a paying out mechanism (not shown), and is composed so as to pay out the recording medium 114 one sheet at a time from the paper feed tray 122. The recording medium 114 paid out from the paper feed tray 122 is registered in position by a guide member (not shown) and halted temporarily in such a manner that the leading end portion is disposed at the position of the gripper (not shown) on the transfer drum (paper feed drum) 132.

<Treatment Liquid Application Unit>

The treatment liquid application unit 130 includes: the pressure drum (treatment liquid drum) 134, which holds, on the outer circumferential surface thereof, the recording medium 114 transferred from the paper feed drum 132 and conveys the recording medium 114 in the prescribed conveyance direction; and the treatment liquid application device 136, which applies the treatment liquid to the recording surface of the recording medium 114 held on the outer circumferential surface of the treatment liquid drum 134. When the treatment liquid drum 134 is rotated in the counter-clockwise direction in FIG. 6, the recording medium 114 is conveyed so as to rotate in the counter-clockwise direction following the outer circumferential surface of the treatment liquid drum 134.

The treatment liquid application device 136 shown in FIG. 6 is arranged at a position facing the outer circumferential surface (recording medium holding surface) of the treatment liquid drum 134. One example of the composition of the treatment liquid application device 136 is a mode which includes: a treatment liquid vessel, which stores the treatment liquid; an uptake roller, which is partially immersed in the treatment liquid in the treatment liquid vessel and takes up the treatment liquid from the treatment liquid vessel; and an application roller (rubber roller), which moves the treatment liquid taken up by the uptake roller onto the recording medium 114.

A desirable mode is one which includes an application roller movement mechanism, which moves the application roller in the upward and downward direction (the normal direction with respect to the outer circumferential surface of the treatment liquid drum 134), so as to be able to avoid collisions between the application roller and the grippers 180A and 180B.

The treatment liquid applied on the recording medium 114 by the treatment liquid application device 136 contains a coloring material aggregating agent, which aggregates the coloring material (pigment) in the ink to be deposited by the image formation unit 140, and when the treatment liquid and the ink come into contact with each other on the recording medium 114, the separation of the coloring material and the solvent in the ink is promoted.

It is desirable that the treatment liquid application device 136 doses the amount of treatment liquid applied to the recording medium 114 while applying the treatment liquid, and that the thickness of the film of treatment liquid on the recording medium 114 is sufficiently smaller than the diameter of the ink droplets which are ejected from the image formation unit 140.

<Image Formation Unit>

The image formation unit 140 includes: the pressure drum (image formation drum) 144, which holds and conveys the recording medium 114; a paper pressing roller 146 for causing the recording medium 114 to adhere tightly to the image formation drum 144; and inkjet heads 148M, 148K, 148C and 148Y, which deposit the inks onto the recording medium 114. The basic structure of the image formation drum 144 is common to that of the treatment liquid drum 134, which is described previously, and therefore the description of it is omitted here. Each of the inkjet heads 148M, 148K, 148C and 148Y corresponds to the inkjet head 12 shown in FIG. 1A.

The paper pressing roller 146 is a guide member for causing the recording medium 114 to make tight contact with the outer circumferential surface of the image formation drum 144, and is disposed facing the outer circumferential surface of the image formation drum 144, to the downstream side, in terms of the conveyance direction of the recording medium 114, of the transfer position of the recording medium 114 between the transfer drum 142 and the image formation drum 144 and to the upstream side, in terms of the conveyance direction of the recording medium 114, of the inkjet heads 148M, 148K, 148C and 148Y.

When the recording medium 114 that has been transferred from the transfer drum 142 to the image formation drum 144 is conveyed to rotate in a state where the leading end is held by the gripper (not denoted with reference numeral), the recording medium 114 is pressed by the paper pressing roller 146 and is caused to make tight contact with the outer circumferential surface of the image formation drum 144. After the recording medium 114 has been caused to make tight contact with the outer circumferential surface of the image formation drum 144 in this way, the recording medium 114 is passed to a printing region directly below the inkjet heads 148M, 148K, 148C and 148Y, without any floating up of the recording medium 114 from the outer circumferential surface of the image formation drum 144.

The inkjet heads 148M, 148K, 148C and 148Y respectively correspond to the inks of the four colors of magenta (M), black (K), cyan (C) and yellow (Y), and are disposed in this order from the upstream side in terms of the direction of rotation of the image formation drum 144 (the counter-clockwise direction in FIG. 6), and ink ejection surfaces of the inkjet heads 148M, 148K, 148C and 148Y (i.e., nozzle surfaces 114A shown in FIG. 10) are disposed so as to face the recording surface of the recording medium 114 that is held on the image formation drum 144. Here, the "ink ejection surfaces (nozzle surfaces)" are surfaces of the inkjet heads 148M, 148K, 148C and 148Y which face the recording surface of the recording medium 114, and are the surfaces where the nozzles 208 (see FIG. 9) which eject the inks as described below are formed. These nozzles 208 correspond to the nozzles 10 shown in FIG. 1A.

Furthermore, the inkjet heads 148M, 148K, 148C and 148Y shown in FIG. 6 are disposed at an inclination with respect to the horizontal plane in such a manner that the nozzle surfaces of the inkjet heads 148M, 148K, 148C and 148M are substantially parallel to the recording surface of the recording medium 114 that is held on the outer circumferential surface of the image formation drum 144.

The inkjet heads 148M, 148K, 148C and 148Y are full line heads having a length corresponding to the maximum width of the image forming region on the recording medium 114 (the dimension of the recording medium 114 in the direction perpendicular to the conveyance direction), and are fixed so as to extend in a direction perpendicular to the conveyance direction of the recording medium 114.

The nozzles for ejecting the inks are formed in a matrix configuration on the nozzle surfaces of the inkjet heads 148M, 148K, 148C and 148Y throughout the whole width of the image forming region of the recording medium 114.

When the recording medium 114 is conveyed to a printing region directly below the inkjet heads 148M, 148K, 148C and 148Y, inks of respective colors are ejected as droplets on the basis of image data, from the inkjet heads 148M, 148K, 148C and 148Y and deposited onto the region of the recording medium 114 where the aggregating treatment liquid has been applied.

When the droplets of the colored inks are ejected from the corresponding inkjet heads 148M, 148K, 148C and 148Y toward the recording surface of the recording medium 114 held on the outer circumferential surface of the image formation drum 144, the inks make contact with the treatment liquid on the recording medium 114, and an aggregating reaction occurs with coloring material (pigment-based coloring material) that is dispersed in the inks or coloring material (dye-based coloring material) that can be insolubilized, thereby forming an aggregate of the coloring material. Thus, movement of the coloring material in the image formed on the recording medium 114 (namely, positional displacement of the dots, color non-uniformities of the dots) is prevented.

Furthermore, the image formation drum 144 of the image formation unit 140 is structurally separate from the treatment liquid drum 134 of the treatment liquid application unit 130, and therefore the treatment liquid is never applied to the inkjet heads 148M, 148K, 148C and 148Y, and it is possible to reduce the causes of ink ejection abnormalities.

Although a configuration with the four standard colors of C, M, Y and K is described in the present embodiment, the combinations of the ink colors and the number of colors are not limited to these. Light and/or dark inks, and special color inks can be added as required. For example, a configuration is possible in which inkjet heads for ejecting light-colored inks, such as light cyan and light magenta, are added, and there is no particular restriction on the arrangement sequence of the heads of the respective colors.

<Drying Process Unit>

The drying process unit 150 includes: the pressure drum (drying drum) 154, which holds and conveys the recording medium 114 after image formation; and a solvent drying unit 156, which carries out a drying process for evaporating off the water content (liquid component) on the recording medium 114. The basic structure of the drying drum 154 is common to that of the treatment liquid drum 134 and the image formation drum 144 described previously, and therefore further description thereof is omitted here.

The solvent drying unit 156 is a processing unit which is disposed in a position facing the outer circumferential surface of the drying drum 154 and evaporates off the water content present on the recording medium 114. When the ink is deposited on the recording medium 114 by the image formation unit 140, the liquid component (solvent component) of the ink and the liquid component (solvent component) of the treatment liquid that have been separated by the aggregating reaction between the treatment liquid and the ink remain on the recording medium 114, and therefore it is necessary to remove this liquid component.

The solvent drying unit 156 is a processing unit which carries out a drying process by evaporating off the liquid component present on the recording medium 114, through heating by a heater, or air blowing by a fan, or a combination of these, in order to remove the liquid component on the recording medium 114. The amount of heating and the air flow volume applied to the recording medium 114 are set appropriately in accordance with parameters, such as the amount of water remaining on the recording medium 114, the type of recording medium 114, the conveyance speed of the recording medium 114 (interference processing time), and the like.

When the drying process is carried out by the solvent drying unit 156, since the drying drum 154 of the drying process unit 150 is structurally separate from the image formation drum 144 of the image formation unit 140, then it is possible to reduce the causes of ink ejection abnormalities due to drying of the head meniscus portions in the inkjet heads 148M, 148K, 148C and 148Y as a result of the applied heat or air flow.

In order to display an effect in correcting cockling of the recording medium 114, the curvature of the drying drum 154 is desirably 0.002 (1/mm) or greater. Furthermore, in order to prevent curving (curling) of the recording medium after the drying process, the curvature of the drying drum 154 is desirably 0.0033 (1/mm) or less.

Moreover, desirably, a device for adjusting the surface temperature of the drying drum 154 (for example, an internal heater) may be provided to adjust the surface temperature to 50° C. or above. Drying is promoted by carrying out a heating process from the rear surface of the recording medium 114, thereby preventing destruction of the image in the subsequent fixing process. According to this mode, more beneficial effects are obtained if a device for causing the recording medium 114 to adhere tightly to the outer circumferential surface of the drying drum 154 is provided. Examples of a device for causing tight adherence of the recording medium 114 include a vacuum suction device, electrostatic attraction device or the like.

There are no particular restrictions on the upper limit of the surface temperature of the drying drum 154, but from the viewpoint of the safety of maintenance operations such as cleaning the ink adhering to the surface of the drying drum 154 (e.g. preventing burns due to high temperature), desirably, the surface temperature of the drying drum 154 is not higher than 75° C. (and more desirably, not higher than 60° C.).

By holding the recording medium 114 in such a manner that the recording surface thereof is facing outward on the outer circumferential surface of the drying drum 154 having this composition (in other words, in a state where the recording surface of the recording medium 114 is curved in a projection shape), and carrying out the drying process while conveying the recording medium 114 in rotation, it is possible reliably to prevent drying non-uniformities caused by wrinkling or floating up of the recording medium 114.

<Fixing Process Unit>

The fixing process unit 160 includes: the pressure drum (fixing drum) 164, which holds and conveys the recording medium 114; a heater 166, which carries out a heating process on the recording medium 114 which the image has been formed on and the liquid has been removed from; and a fixing roller 168, which presses the recording medium 114 from the recording surface side. The basic structure of the fixing drum 164 is common to that of the treatment liquid drum 134, the image formation drum 144 and the drying drum 154, and description thereof is omitted here. The heater 166 and the fixing roller 168 are disposed in positions facing the outer circumferential surface of the fixing drum 164, and are situated in this order from the upstream side in terms of the direction of rotation of the fixing drum 164 (the counterclockwise direction in FIG. 6).

In the fixing process unit 60, a preliminary heating process by means of the heater 166 is carried out onto the recording surface of the recording medium 114, and a fixing process by means of the fixing roller 168 is also carried out. The heating temperature of the heater 166 is set appropriately in accordance with the type of the recording medium, the type of ink (the type of polymer particles contained in the ink), and the like. For example, a possible mode is one where the heating temperature is set to the glass transition temperature or the minimum film forming temperature of the polymer particles contained in the ink.

The fixing roller 168 is a roller member for melting the self-dispersing polymer particles contained in the ink and thereby causing a state where the ink is covered with a film, by applying heat and pressure to the dried ink, and is composed so as to apply heat and pressure to the recording medium 114. More specifically, the fixing roller 168 is disposed so as to contact and press against the fixing drum 164, in such a manner that the fixing roller 168 serves as a nip roller with respect to the fixing drum 164. By this means, the recording medium 114 is held between the fixing roller 168 and the fixing drum 164 and is nipped with a prescribed nip pressure, whereby the fixing process is carried out.

An example of the composition of the fixing roller 168 is a mode where the fixing roller 168 is constituted of a heating roller which incorporates a halogen lamp inside a metal pipe made of aluminum, or the like, having good heat conductivity. If heat energy at or above the glass transition temperature of the polymer particles contained in the ink is applied by heating the recording medium 114 by means of this heating roller, then the polymer particles melt and a transparent film is formed on the surface of the image.

By applying pressure to the recording surface of the recording medium 114 in this state, the polymer particles which have melted are pressed and fixed into the undulations in the recording medium 114, and the undulations in the image surface are thereby leveled out, thus making it possible to obtain a desirable luster. A desirable composition is one where fixing rollers 168 are provided in a plurality of stages, in accordance with the thickness of the image layer and the glass transition temperature characteristics of the polymer particles.

Furthermore, desirably, the surface hardness of the fixing roller 168 is not higher than 71°. By further softening the surface of the fixing roller 168, it is possible to expect effects in following the undulations of the recording medium 114 which are produced by cockling, and fixing non-uniformities caused by the undulations of the recording medium 114 are prevented more effectively.

The inkjet recording apparatus 100 shown in FIG. 6 includes an in-line sensor 182, which is arranged at a later stage of the processing region of the fixing process unit 160 (on the downstream side in terms of the direction of conveyance of the recording medium). The in-line sensor 182 is a sensor for reading the image formed on the recording medium 114 (or a test pattern (check pattern) formed in the margin area of the recording medium 114), and desirably employs a CCD line sensor.

In the inkjet recording apparatus 100 in the present embodiment, it is judged whether there are ejection abnormalities in the inkjet heads 148M, 148K, 148C and 148Y, on the basis of the reading results of the in-line sensor 182.

More specifically, it is ascertained whether there are defective nozzles in which ejection abnormality has occurred, on the basis of the read information from the in-line sensor 182, and furthermore the nozzle positions of the defective nozzles ($X_i$ in FIG. 1A) are identified. Defective recording element position information $X_i$ is acquired on the basis of the read results of the in-line sensor 182, the defective recording element position information $X_i$ is supplied to a prescribed signal processing unit, and defective recording element distance information $D_i$ is obtained. Thus, the inkjet recording apparatus 100 is able to acquire the defective recording element position information $X_i$ and the defective recording element distance information $D_i$ by in-line inspection.

Furthermore, the in-line sensor 182 may include measurement devices for measuring the water content, surface temperature, luster (gloss level), and the like. According to this mode, parameters, such as the processing temperature of the drying process unit 150 and the heating temperature and applied pressure of the fixing process unit 160, are adjusted appropriately on the basis of the read result for the water content, surface temperature and luster, and thereby the above control parameters are properly controlled in accordance with the temperature alteration inside the apparatus and the temperature alteration of the respective parts.

<Output Unit>

As shown in FIG. 6, the output unit 170 is arranged subsequently to the fixing process unit 160. The output unit 170 includes an endless conveyance belt 174 wrapped about tensioning rollers 172A and 172B, and an output tray 176, in which the recording medium 114 after the image formation is accommodated.

The recording medium 114 that has undergone the fixing process and output from the fixing process unit 160 is conveyed by the conveyance belt 174 and output to the output tray 176.

<Structure of Inkjet Head>

Figure 7:
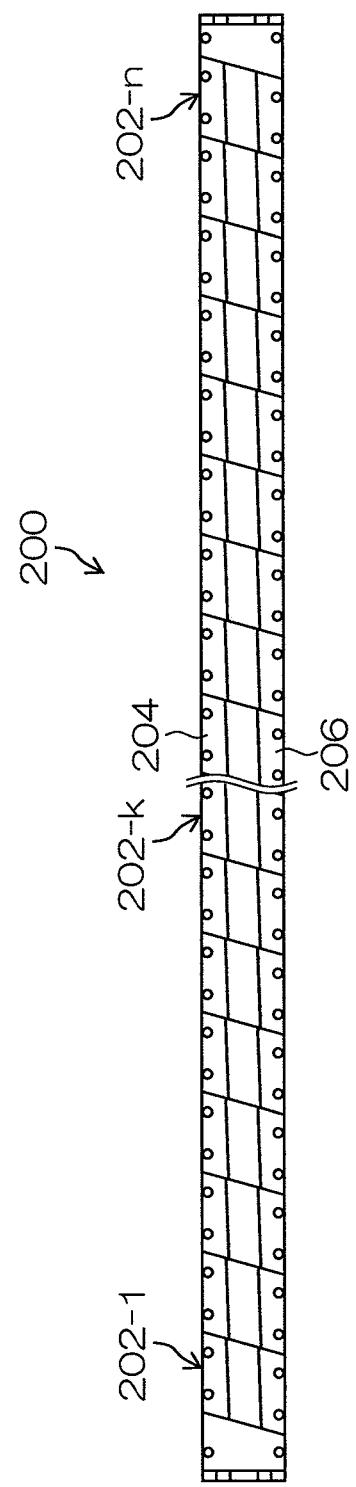
FIG. 7 is a plan diagram of an inkjet head installed in the inkjet recording apparatus shown in FIG. 6.

FIG. 7 is a schematic drawing of the inkjet heads 148M, 148K, 148C and 148Y installed in the inkjet recording apparatus 100 shown in FIG. 6, and depicts the inkjet head as if the inkjet head is looked at through in a direction from the inkjet head toward a recording surface of a recording medium. The inkjet heads 148M, 148K, 148C and 148Y shown in FIG. 6 have the same structure, and therefore in the following description, these are referred to jointly as "inkjet head 200" or simply as "head 200", unless there is a need to differentiate between the inkjet heads 148M, 148K, 148C and 148Y.

The head 200 shown in FIG. 6 forms a multi-head by joining together n sub-heads 202-k (where n is an integer larger than 1, and k is an integer from 1 to n) in a row. Furthermore, the sub-heads 202-k are supported by head covers 204 and 206 from either side of the width direction of the head 200. It is also possible to constitute a multi-head by arranging sub-heads 202 in a staggered configuration.

One example of the application of the multi-head constituted of the sub-heads is a full-line head, which corresponds to the entire width of a recording medium. The full-line head has a structure in which a plurality of nozzles (denoted with reference numeral 208 in FIG. 9) are arranged in a direction (main scanning direction) which is perpendicular to the direction of movement of the recording medium (sub-scanning direction), through the dimension (width) of the recording medium in the main scanning direction. An image can be formed over the full surface of the recording medium by means of a so-called single-pass image recording method in which image recording is carried out by performing one relative movement action of the head 200 having this structure and the recording medium.

Figure 8:
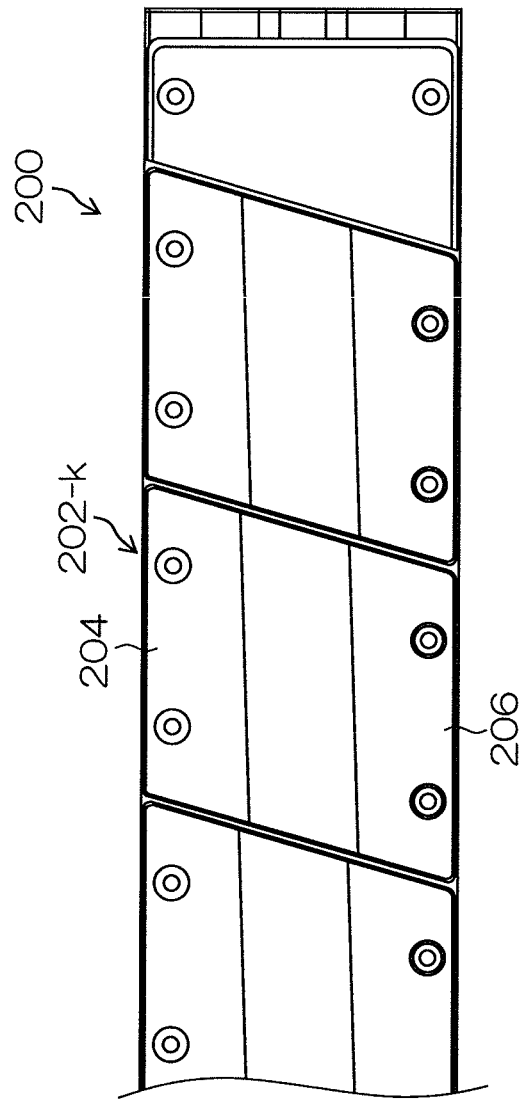
FIG. 8 is an enlarged view of FIG. 7.

FIG. 8 is a partial enlarged diagram of the head 200. As shown in FIG. 8, the sub-heads 202 have a substantially parallelogram-shaped planar shape, and there is an overlap section between mutually adjacent sub-heads. The overlap section is a joint section between sub-heads, in which dots that are mutually adjacent in the alignment direction of the sub-heads 202-k (the horizontal direction in FIG. 8; the main scanning direction in FIG. 9) are formed by the nozzles belonging to different sub-heads.

Figure 9:
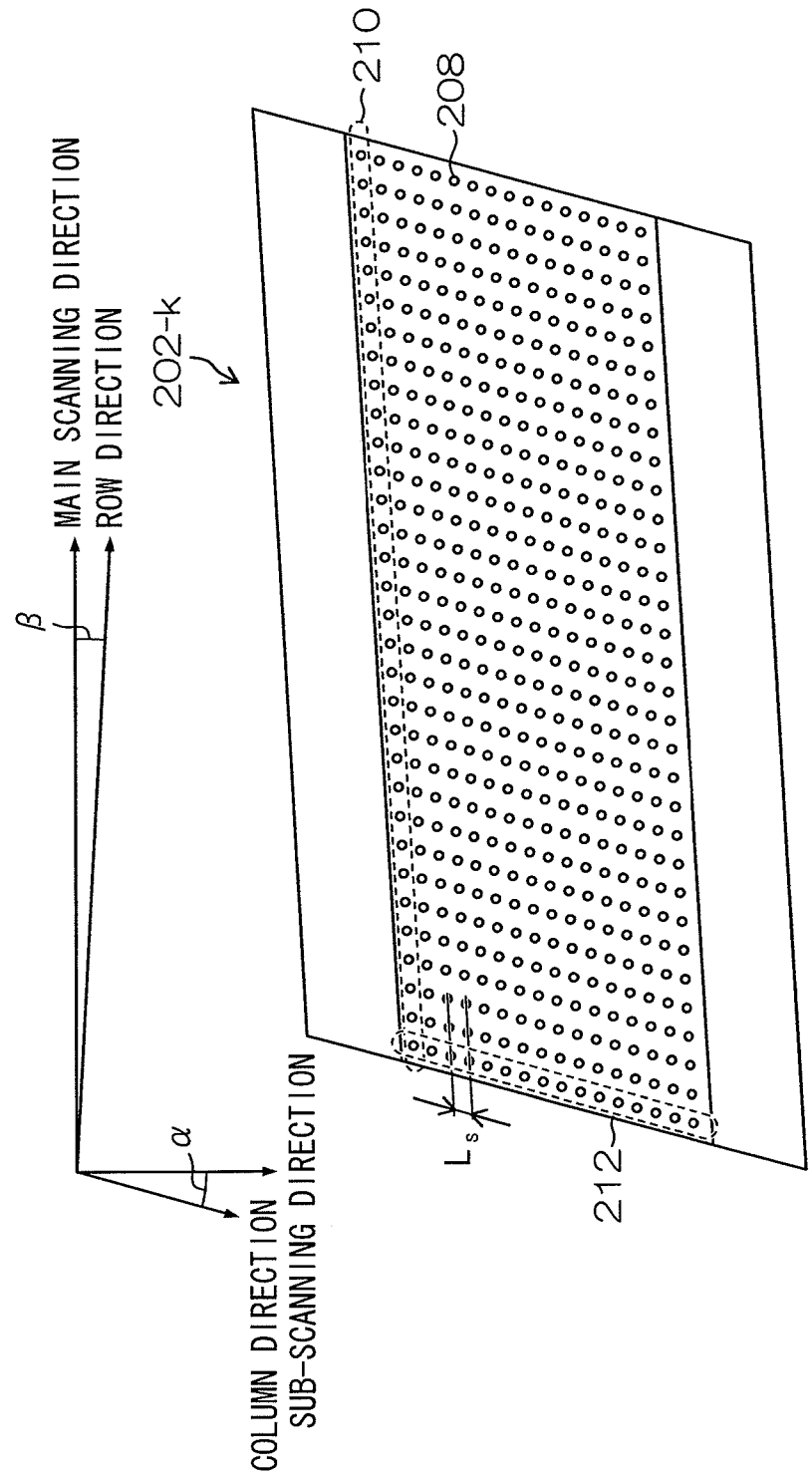
FIG. 9 is a diagram illustrating a nozzle arrangement in a sub head shown in FIG. 7.

FIG. 9 is a plan diagram showing a nozzle arrangement in a sub-head 202-k. As shown in FIG. 9, each sub-head 202-k has a structure in which the nozzles 208 are arranged in a two-dimensional configuration, and a head including the sub-heads 202-k of this kind is known as a so-called matrix head.

If a projected nozzle row is considered in which the nozzles 208 arranged in the matrix configuration in FIG. 9 are projected so as to align in the main scanning direction, then it is possible to express the nozzle positions by $X_i$ similarly to the head 12 shown in FIG. 1A.

The sub-head 202-k shown in FIG. 9 has a structure in which the nozzles 208 are arranged in a column direction that forms an angle $\alpha$ with respect to the sub-scanning direction, and a row direction that forms an angle $\beta$ with respect to the main scanning direction, thereby achieving a high density of the effective nozzle arrangement density in the main scanning direction. In FIG. 9, a nozzle group (nozzle row) arranged in the row direction is denoted with reference numeral 210, and a nozzle group (nozzle column) arranged in the column direction is denoted with reference numeral 212.

Figure 10:
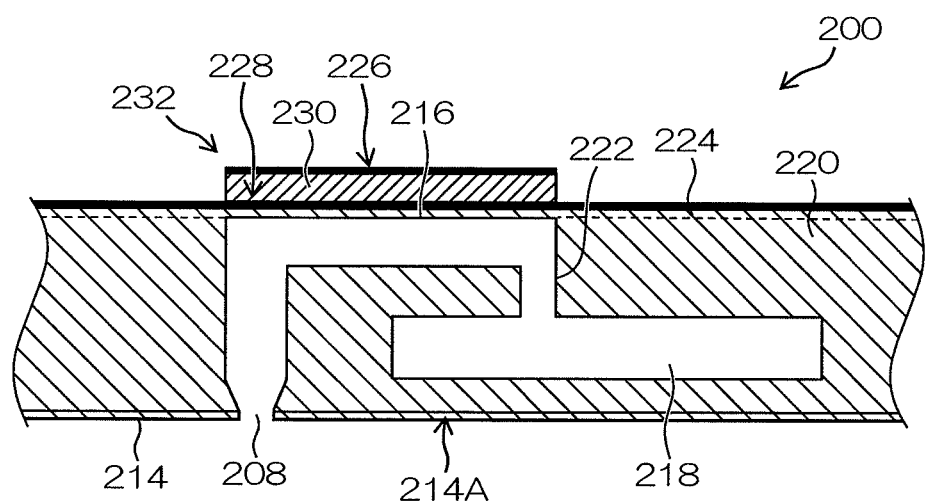
FIG. 10 is a cross-sectional diagram showing an inner structure of the sub head shown in FIG. 7.

FIG. 10 is a cross-sectional diagram illustrating a liquid droplet ejection element for one channel being a recording element unit (an ink chamber unit corresponding to one nozzle 208).

As shown in FIG. 10, the head 200 in the present embodiment is configured by stacking and joining together a nozzle plate 214, in which the nozzles 208 are formed, a flow channel plate 220, in which the pressure chambers 216 and the flow channels including the common flow channel 218 are formed, and the like. The nozzle plate 214 constitutes a nozzle surface 214A of the head 200 and has formed therein the two-dimensionally arranged nozzles 208 communicating respectively to the pressure chambers 216.

The flow channel plate 220 constitutes lateral side wall parts of the pressure chamber 216 and serves as a flow channel formation member, which forms the supply port 222 as a limiting part (the narrowest part) of the individual supply channel leading the ink from a common flow channel 218 to the pressure chamber 216. FIG. 10 is simplified for the convenience of explanation, and the flow channel plate 220 may be structured by stacking one or more substrates.

The nozzle plate 214 and the flow channel plate 220 can be made of silicon and formed in the prescribed shapes by means of the semiconductor manufacturing process.

The common flow channel 218 is connected to an ink tank (not shown), which is a base tank for supplying ink, and the ink supplied from the ink tank is delivered through the common flow channel 218 to the pressure chambers 216.

A piezoelectric actuator 232 is bonded on a diaphragm 224 constituting a part of faces (the ceiling face in FIG. 10) of the pressure chamber 216. The piezoelectric actuator 232 has an individual electrode 226 and a lower electrode 228, between which a piezoelectric body 230 is arranged. The diaphragm 224 can be made of a metal film or a metal film having an oxide layer; and in this case, the diaphragm 224 can also serve as a common electrode corresponding to lower electrodes of a plurality of piezoelectric actuators 232. The diaphragm 256 can be made of a non-conductive material such as resin; and in this case, a lower electrode layer made of a conductive material such as metal is formed on the surface of the diaphragm member.

When a drive voltage is applied between the individual electrode 226 and the lower electrode 228, the piezoelectric actuator 232 is deformed, the volume of the pressure chamber 216 is thereby changed, and the pressure in the pressure chamber 216 is thereby changed, so that the ink inside the pressure chamber 216 is ejected through the nozzle 208. When the displacement of the piezoelectric actuator 232 is returned to its original state after the ink is ejected, new ink is refilled in the pressure chamber 216 from the common flow channel 218 through the supply port 222.

As illustrated in FIG. 9, the plurality of ink chamber units having the above-described structure are arranged in a prescribed matrix arrangement pattern in a line direction forming an angle of β with respect to the main scanning direction and a column direction forming an angle of α with respect to the sub-scanning direction, and thereby the high density nozzle head is formed in the present embodiment. $L_s$ is a distance between the nozzles 251 adjacent in the sub-scanning direction. In this matrix arrangement, the nozzles 251 can be regarded to be equivalent to those substantially arranged at a fixed pitch along the main scanning direction.

<Description of Control System>

Figure 11:
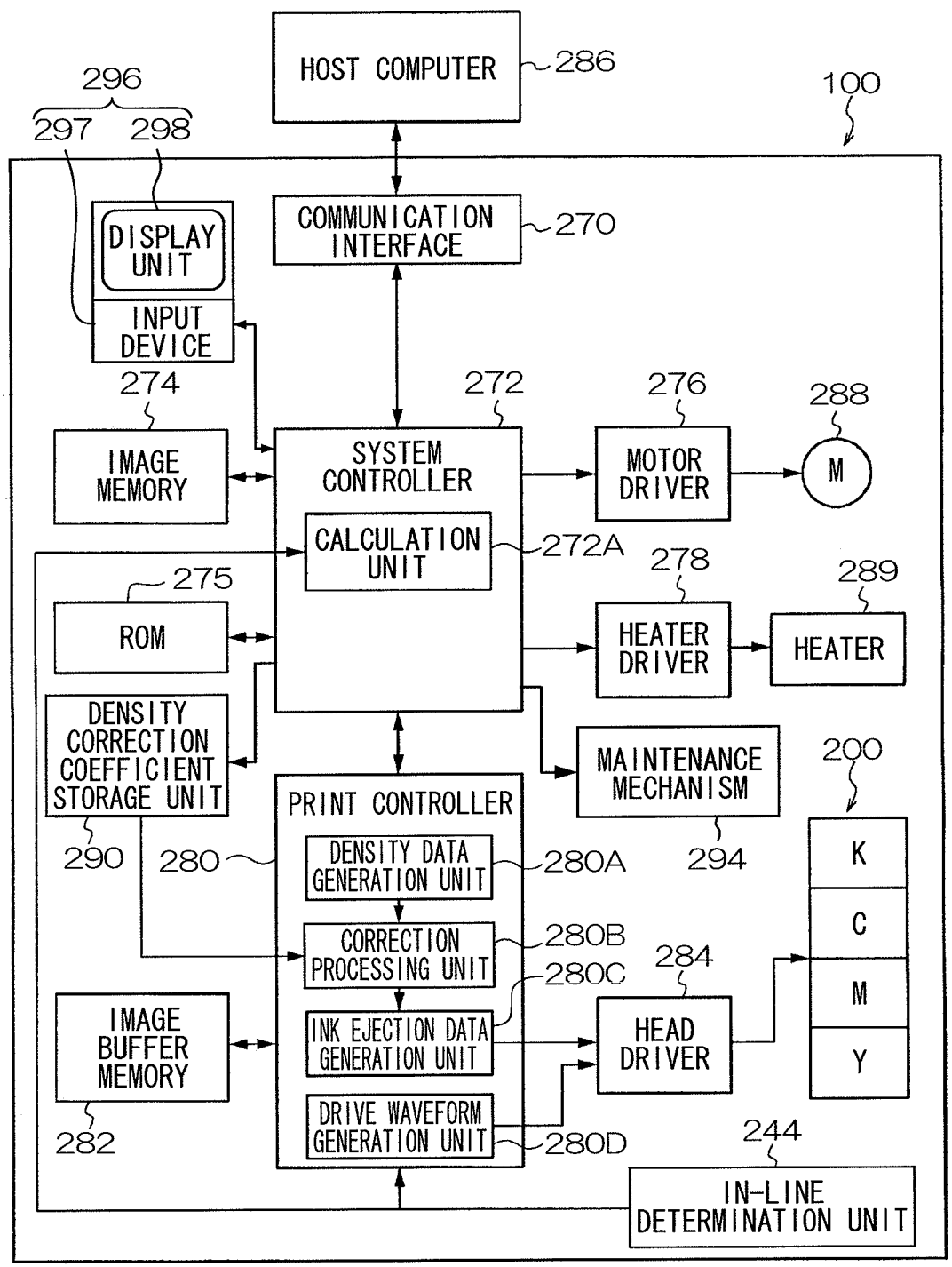
FIG. 11 is a block diagram showing a configuration of the control system of the inkjet recording apparatus shown in FIG. 6.
Figure 12A:
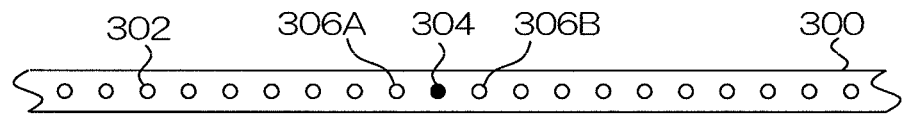
FIGS. 12A to 12D are diagrams for describing a method of compensating an isolated defective recording element in the related art.
Figure 12B:
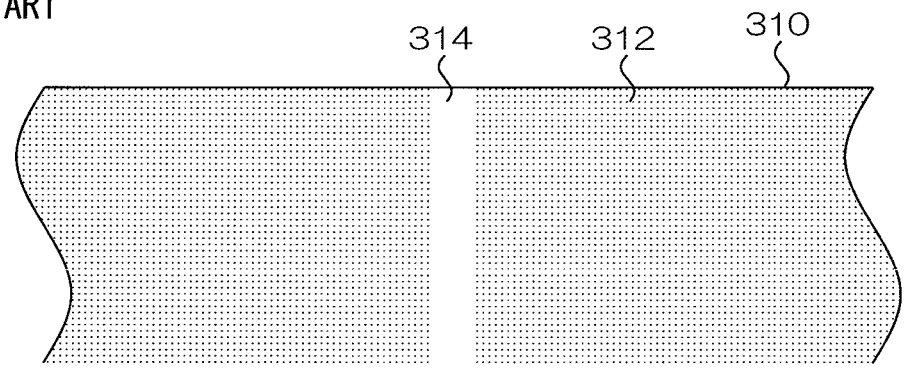
Figure 12C:
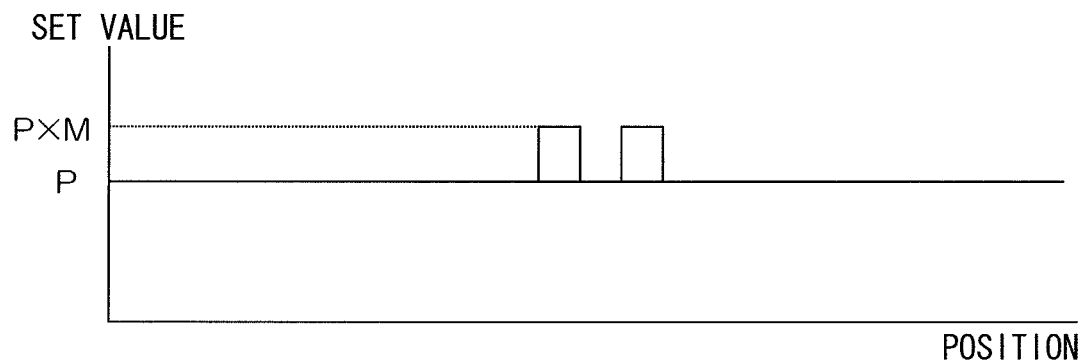
Figure 12D:
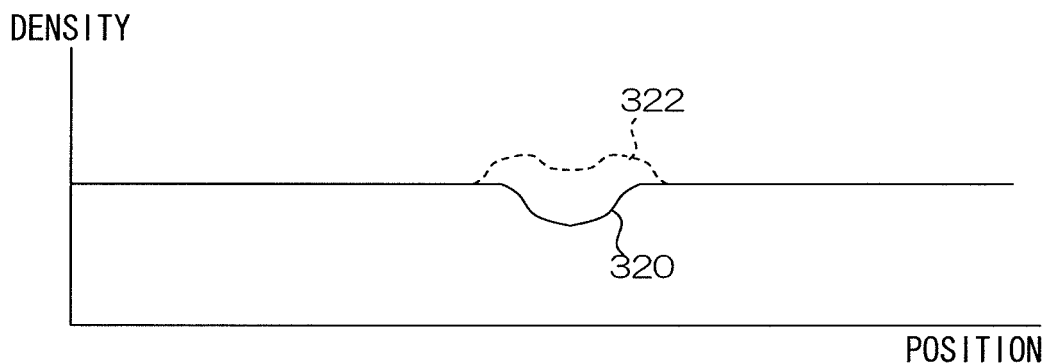

FIG. 11 is a block diagram showing the system configuration of the inkjet recording apparatus 100. As shown in FIG. 11, the inkjet recording apparatus 100 includes a communication interface 270, a system controller 272, an image memory 274, a ROM 275, a motor driver 276, a heater driver 278, a print controller 280, an image buffer memory 282, a head driver 284, a maintenance mechanism 294, an operating unit 296, and the like.

The communication interface 270 is an interface unit (image input device) for receiving image data sent from a host computer 286. A serial interface such as USB (Universal Serial Bus), IEEE1394, Ethernet (registered trademark), and wireless network, or a parallel interface such as a Centronics interface may be used as the communication interface 270. A buffer memory (not shown) may be mounted in this portion in order to increase the communication speed.

The image data sent from the host computer 286 is received by the inkjet recording apparatus 100 through the communication interface 270, and is temporarily stored in the image memory 274. The image memory 274 is a storage device for storing images inputted through the communication interface 270, and data is written and read to and from the image memory 274 through the system controller 272. The image memory 274 is not limited to a memory composed of semiconductor elements, and a hard disk drive or another magnetic medium may be used.

The system controller 272 is constituted of a central processing unit (CPU) and peripheral circuits thereof, and the like, and it functions as a control device for controlling the whole of the inkjet recording apparatus 100 in accordance with a prescribed program, as well as a calculation device for performing various calculations. More specifically, the system controller 272 controls the various sections, such as the communication interface 270, image memory 274, motor driver 276, heater driver 278, and the like, as well as controlling communications with the host computer 286 and writing and reading to and from the image memory 274 and the ROM 275, and it also generates control signals for controlling the motor 188 and heater 189 of the conveyance system.

Furthermore, the system controller 272 includes a calculation unit 272A, which performs calculation processing for generating defective recording element distance information in accordance with the defective recording element position information obtained from the data read in from the test chart and the below described nozzle check pattern by the in-line determination unit 244, and for calculating the first and second correction coefficients and the defective recording element tone correction coefficient. The processing functions of the calculation unit 272A can be achieved by means of an ASIC (application specific integrated circuit), software, or a suitable combination of same.

The defective recording element tone correction coefficient data obtained by the calculation unit 272A is stored in a density correction coefficient storage unit 290.

The program executed by the CPU of the system controller 272 and the various types of data (including data for deposition to form the test chart, data of abnormal nozzles, and the like) which are required for control procedures are stored in the ROM 275. The ROM 275 may be a non-writeable storage device, or it may be a rewriteable storage device, such as an EEPROM. By utilizing the storage region of this ROM 275, the ROM 275 can be configured to be able to serve also as the density correction coefficient storage unit 290. It is also possible that defective recording element tone correction coefficient data obtained in the off-line determination is stored in the ROM 275.

The image memory 274 is used as a temporary storage region for the image data, and it is also used as a program development region and a calculation work region for the CPU.

The motor driver (drive circuit) 276 drives the motor 288 of the conveyance system in accordance with commands from the system controller 272. The heater driver (drive circuit) 278 drives the heater 289 of the drying unit 150 (see FIG. 6) or the like in accordance with commands from the system controller 272.

The print controller 280 is a control unit which functions as a signal processing device for performing various treatment processes, corrections, and the like, in accordance with the control implemented by the system controller 272, in order to generate a signal for controlling droplet ejection from the image data (multiple-value input image data) in the image memory 274, as well as functioning as a drive control device which controls the ejection driving of the head 200 by supplying the ink ejection data thus generated to the head driver 284.

In other words, the print controller 280 includes a density data generation unit 280A, a correction processing unit 280B, an ink ejection data generation unit 280C and a drive waveform generation unit 280D. These functional units (280A to 280D) can be realized by means of an ASIC, software or a suitable combination of same. The density data generation unit 280A and the correction processing unit 280B correspond respectively to the tone correction unit 42 and the defective recording element compensation unit 44 shown in FIG. 4.

The density data generation unit 280A is a signal processing device which generates initial density data for the respective ink colors, from the input image data, and it carries out density conversion processing (including UCR processing and color conversion) and, where necessary, it also performs pixel number conversion processing.

The correction processing unit 280B is a processing device which performs density correction calculations using the density correction coefficients stored in the density correction coefficient storage unit 290.

The ink ejection data generation unit 280C is a signal processing device including a halftoning device which converts the corrected image data (density data) generated by the correction processing unit 280B into binary or multiple-value dot data, and the ink ejection data generation unit 180C carries out N-value conversion processing (where N is two or more).

The halftoning device may employ commonly known methods of various kinds, such as an error diffusion method, a dithering method, a threshold value matrix method, a density pattern method, and the like. The halftoning process generally converts a tonal image data having M values (M≧3) into tonal image data having N values (N<M). In the simplest embodiment, the image data is converted into dot image data having 2 values (dot on/dot off); however, in a halftoning process, it is also possible to perform quantization in multiple values which correspond to different types of dot size (for example, three types of dot: a large dot, a medium dot and a small dot). The ink ejection data generation unit 280C corresponds to the N-value conversion processing unit 46 shown in FIG. 4.

The ink ejection data generated by the ink ejection data generation unit 280C is supplied to the head driver 284, which controls the ink ejection operation of the head 200 accordingly.

The drive waveform generation unit 280D is a device for generating drive signal waveforms in order to drive the actuators 232 (see FIG. 10) corresponding to the respective nozzles 208 of the head 200. The signal (drive waveform) generated by the drive waveform generation unit 280D is supplied to the head driver 284. The signal outputted from the drive waveforms generation unit 280D may be digital waveform data, or it may be an analog voltage signal.

The drive waveform generation unit 280D generates selectively the drive signal for the recording waveform and the drive signal for the abnormal nozzle detective waveform. The various waveform data is beforehand stored in the ROM 275, and the waveform data to be used is selectively output according to requirements. The drive waveform generation unit 280D corresponds to the drive signal generation unit 48 shown in FIG. 4.

The print controller 280 is provided with the image buffer memory 282, and image data, parameters, and other data are temporarily stored in the image buffer memory 282 when image data is processed in the print controller 280. FIG. 11 shows a mode in which the image buffer memory 282 is attached to the print controller 280; however, the image memory 274 may also serve as the image buffer memory 282. Also possible is a mode in which the print controller 280 and the system controller 272 are integrated to form a single processor.

To give a general description of the sequence of processing from image input to print output, image data to be printed (original image data) is inputted from an external source through the communication interface 270, and is accumulated in the image memory 274. At this stage, multiple-value RGB image data is stored in the image memory 274, for example.

In this inkjet recording apparatus 100, an image which appears to have a continuous tonal graduation to the human eye is formed by changing the deposition density and the dot size of fine dots created by ink (coloring material), and therefore, it is necessary to convert the input digital image into a dot pattern which reproduces the tonal graduations of the image (namely, the light and shade toning of the image) as faithfully as possible. Therefore, original image data (RGB data) stored in the image memory 274 is sent to the print controller 280, through the system controller 272, and is converted to the dot data for each ink color by a half-toning technique, using dithering, error diffusion, or the like, by passing through the density data generation unit 280A, the correction processing unit 280B, and the ink ejection data generation unit 280C of the print controller 280.

In other words, the print controller 280 performs processing for converting the input RGB image data into dot data for the four colors of M, K, C and Y. The dot data thus generated by the print controller 280 is stored in the image buffer memory 282. This dot data of the respective colors is converted into MKCY droplet ejection data for ejecting ink from the nozzles of the head 200, thereby establishing the ink ejection data to be printed.

The head driver 284 outputs drive signals for driving the actuators 232 corresponding to the nozzles 208 of the head 200 in accordance with the print contents, on the basis of the ink ejection data and the drive waveform signals supplied by the print controller 280. A feedback control system for maintaining constant drive conditions in the head may be included in the head driver 284.

By supplying the drive signals outputted by the head driver 284 to the head 200 in this way, ink is ejected from the corresponding nozzles 208. By controlling ink ejection from the print head 200 in synchronization with the conveyance speed of the recording medium 114, an image is formed on the recording medium 114.

As described above, the ejection volume and the ejection timing of the ink droplets from the respective nozzles are controlled through the head driver 284, on the basis of the ink ejection data generated by implementing prescribed signal processing in the print controller 280, and the drive signal waveform. By this means, prescribed dot size and dot positions can be achieved.

The in-line determination unit 244 is a block including the in-line sensor 182 shown in FIG. 6, and reads in the image printed on the recording medium 114, performs various signal processing operations, and the like, and determines the print situation (presence/absence of ejection, variation in droplet ejection, optical density, and the like), these determination results being supplied to the print controller 280 and the system controller 272.

The print controller 280 implements various corrections with respect to the head 200, on the basis of the information obtained from the in-line determination unit 244, according to requirements, and it implements control for carrying out cleaning operations (nozzle restoring operations), such as preliminary ejection, suctioning, or wiping, as and when necessary.

The maintenance mechanism 294 includes members used to head maintenance operation, such as an ink receptacle, a suction cap, a suction pump, a wiper blade, and the like.

The operating unit 296 which forms a user interface is constituted of an input device 297 through which an operator (user) can make various inputs, and a display unit 298. The input device 297 may employ various formats, such as a keyboard, mouse, touch panel, buttons, or the like. The operator is able to input print conditions, select image quality modes, input and edit additional information, search for information, and the like, by operating the input device 297, and is able to check various information, such as the input contents, search results, and the like, through a display on the display unit 298. The display unit 298 also functions as a warning notification device which displays a warning message, or the like.

The inkjet recording apparatus 100 according to the present embodiment has a plurality of image quality modes, and the image quality mode is set either by a selection operation performed by the user or by automatic selection by a program. The criteria for judging an abnormal nozzle are changed in accordance with the output image quality level which is required by the image quality mode that has been set. If the required image quality is high, then the judgment criteria are set to be more severe.

Information relating to the printing conditions and the abnormal nozzle judgment criteria for each image quality mode is stored in the ROM 275.

It is also possible to adopt a mode in which the host computer 286 is equipped with all or a portion of the processing functions carried out by the calculation unit 272A, the density data generation unit 280A and the correction processing unit 280B described with reference to FIG. 11.

The above-described apparatus composition is merely an example and constituent elements can be removed, added or modified appropriately within a range which enables the aforementioned action and beneficial effects of the image recording method to be obtained.

Example of Application to Other Apparatuses

In the embodiments described above, application to the inkjet recording apparatus for graphic printing has been described, but the scope of application of the present invention is not limited to this. For example, the present invention can also be applied widely to inkjet systems which obtain various shapes or patterns using liquid function material, such as a wire printing apparatus, which forms an image of a wire pattern for an electronic circuit, manufacturing apparatuses for various devices, a resist printing apparatus, which uses resin liquid as a functional liquid for ejection, a color filter manufacturing apparatus, a fine structure forming apparatus for forming a fine structure using a material for material deposition, or the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording method of recording a desired image on a recording medium by a recording head having recording elements which form pixels on the recording medium, while moving at least one of the recording medium and the recording head relatively to each other in a prescribed conveyance direction, the method comprising:
 a defective recording element information acquisition step of acquiring defective recording element information including position information of defective recording elements included in the recording elements; and
 a defective recording element compensation step of performing compensation for the defective recording elements by using compensation recording elements in accordance with a distance between a plurality of the defective recording elements derived from the position information, the compensation recording elements being of normal recording elements included in the recording elements situated nearby the plurality of the defective recording elements.

2. The image recording method as defined in claim 1, wherein in the defective recording element compensation step, tone values representing image information data for the compensation recording elements are changed in accordance with the distance between the plurality of defective recording elements.

3. The image recording method as defined in claim 1, further comprising, after the defective recording element compensation step, a half-tone processing step of performing half-tone processing to convert image data to multiple-value data of a smaller number of tones than a number of tones of the image data.

4. The image recording method as defined in claim 1, wherein in the defective recording element compensation step, sizes of dots recorded on the recording medium by the compensation recording elements are changed in accordance with the distance between the plurality of the defective recording elements.

5. The image recording method as defined in claim 1, wherein the defective recording element information acquisition step includes a defective recording element determination step of performing determination of recording states of the recording elements, and judging whether each of the recording elements is normal or defective in accordance with a result of the determination.

6. The image recording method as defined in claim 1, wherein the defective recording element compensation step includes:
 a first correction function calculation step of calculating a first correction function which is determined in accordance with a tone value of a recording position corresponding to each of the defective recording elements;
 a second correction function calculation step of calculating a second correction function which applies weighting to each of the compensation recording elements in accordance with the distance between the plurality of the defective recording elements, in such a manner that a tone value of a recording position corresponding to the compensation recording element that is situated between the plurality of the defective recording elements is smaller than a tone value of a recording position corresponding to the compensation recording element that is not situated between the plurality of the defective recording elements;
 a tone correction function calculation step of calculating a tone correction function which is determined by the first correction function and the second correction function; and
 a pixel value correction step of correcting the tone values of the recording positions corresponding to the compensation recording elements in accordance with the tone correction function.

7. The image recording method as defined in claim 6, wherein the compensation recording elements include the normal recording elements situated on either side of each of the defective recording elements and having shortest distances from said each of the defective recording elements among the normal recording elements, in a projected recording element row in which the recording elements are projected so as to align in a direction substantially perpendicular to the conveyance direction.

8. The image recording method as defined in claim 7, wherein:
 a position of an i-th defective recording element of the defective recording elements in the projected recording element row is represented as $X_i$;
 a distance from the i-th defective recording element to an (i+1)-th defective recording element of the defective recording elements is represented as $D_i$;
 a tone value of input image data of a pixel in the recording position of each of the defective recording elements is represented as c;
 the first correction function is represented as $F_1(c)$ with the tone value c as a parameter;
 the second correction function is represented as $F_2(D_i)$ with the distance $D_i$ as a parameter;

the tone correction function of the compensation recording element at a position $(X_i-1)$ adjacent to the position of the i-th defective recording element is expressed as $F(X_i-1)=F_1(c) \times F_2(D_{(i-1)})$; and the tone correction function of the compensation recording element at a position $(X_i+1)$ adjacent to the position of the i-th defective recording element is expressed as $F(X_i+1)=F_1(c) \times F_2(D_{(i)})$.

9. The image recording method as defined in claim 8, wherein the second correction function $F_2(D_i)$ has a maximum value of 1.

10. The image recording method as defined in claim 8, further comprising a second correction function storage step of storing the second correction function $F_2(D_i)$ in a form of a one-dimensional look-up table for each of the recording elements.

11. An image recording apparatus, comprising:
- a recording head having recording elements which form pixels on a recording medium;
- a conveyance device which moves at least one of the recording medium and the recording head relatively to each other in a prescribed conveyance direction;
- a defective recording element information acquisition device which acquires defective recording element information including position information of defective recording elements included in the recording elements; and
- a defective recording element compensation device which performs compensation for the defective recording elements by using compensation recording elements in accordance with a distance between a plurality of the defective recording elements derived from the position information, the compensation recording elements being of normal recording elements included in the recording elements situated nearby the plurality of the defective recording elements.

12. The image recording apparatus as defined in claim 11, wherein the defective recording element compensation device changes tone values representing image information data for the compensation recording elements in accordance with the distance between the plurality of the defective recording elements.

13. The image recording apparatus as defined in claim 11, further comprising a half-tone processing device which performs half-tone processing to convert image data having been subjected to the compensation for the defective recording elements by the defective recording element compensation device, to multiple-value data of a smaller number of tones than a number of tones of the image data.

14. The image recording apparatus as defined in claim 11, wherein the defective recording element compensation device changes sizes of dots recorded on the recording medium by the compensation recording elements in accordance with the distance between the plurality of the defective recording elements.

15. The image recording apparatus as defined in claim 11, wherein the defective recording element information acquisition device includes a defective recording element determination device which performs determination of recording states of the recording elements, and judges whether each of the recording elements is normal or defective in accordance with a result of the determination.

16. The image recording apparatus as defined in claim 11, wherein the defective recording element compensation device includes:

- a first correction function calculation device which calculates a first correction function which is determined in accordance with a tone value of a recording position corresponding to each of the defective recording elements;
- a second correction function calculation device which calculates a second correction function which applies weighting to each of the compensation recording elements in accordance with the distance between the plurality of the defective recording elements, in such a manner that a tone value of a recording position corresponding to the compensation recording element that is situated between the plurality of the defective recording elements is smaller than a tone value of a recording position corresponding to the compensation recording element that is not situated between the plurality of the defective recording elements;
- a tone correction function calculation device which calculates a tone correction function which is determined by the first correction function and the second correction function; and
- a pixel value correction device which corrects the tone values of the recording positions corresponding to the compensation recording elements in accordance with the tone correction function.

17. The image recording apparatus as defined in claim 16, wherein the compensation recording elements include the normal recording elements situated on either side of each of the defective recording elements and having shortest distances from said each of the defective recording elements among the normal recording elements, in a projected recording element row in which the recording elements are projected so as to align in a direction substantially perpendicular to the conveyance direction.

18. The image recording apparatus as defined in claim 17, wherein:
- a position of an i-th defective recording element of the defective recording elements in the projected recording element row is represented as $X_i$;
- a distance from the i-th defective recording element to an (i+1)-th defective recording element of the defective recording elements is represented as $D_i$;
- a tone value of input image data of a pixel in the recording position of each of the defective recording elements is represented as c;
- the first correction function is represented as $F_1(c)$ with the tone value c as a parameter;
- the second correction function is represented as $F_2(D_i)$ with the distance $D_i$ as a parameter;
- the tone correction function of the compensation recording element at a position $(X_i-1)$ adjacent to the position of the i-th defective recording element is expressed as $F(X_i-1)=F_1(c) \times F_2(D_{(i-1)})$; and
- the tone correction function of the compensation recording element at a position $(X_i+1)$ adjacent to the position of the i-th defective recording element is expressed as $F(X_i+1)=F_1(c) \times F_2(D_{(i)})$.

19. The image recording apparatus as defined in claim 18, wherein the second correction function $F_2(D_i)$ has a maximum value of 1.

20. The image recording apparatus as defined in claim 18, further comprising a second correction function storage device which stores the second correction function $F_2(D_i)$ in a form of a one-dimensional look-up table for each of the recording elements.

* * * * *